US010913067B2

(12) United States Patent
Wilson et al.

(10) Patent No.: US 10,913,067 B2
(45) Date of Patent: Feb. 9, 2021

(54) BARRIER DROPLET CONFIGURATIONS AGAINST MIGRATION BETWEEN DROPLETS ON AM-EWOD DEVICES

(71) Applicant: Sharp Life Science (EU) Limited, Oxford (GB)

(72) Inventors: Adam Christopher Wilson, Oxford (GB); Sally Anderson, Oxford (GB); Peter Neil Taylor, Oxford (GB); Campbell Donald Brown, Oxford (GB); Pamela Ann Dothie, Oxford (GB); Laura Huang, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 312 days.

(21) Appl. No.: 16/147,964

(22) Filed: Oct. 1, 2018

(65) Prior Publication Data

US 2020/0101460 A1 Apr. 2, 2020

(51) Int. Cl.
*B01L 3/00* (2006.01)
*G02B 26/00* (2006.01)

(52) U.S. Cl.
CPC . *B01L 3/502792* (2013.01); *B01L 2200/0605* (2013.01); *B01L 2200/141* (2013.01);
(Continued)

(58) Field of Classification Search
CPC ..... B01L 2200/0605; B01L 2200/0673; B01L 2200/141; B01L 2200/143;
(Continued)

(56) References Cited

U.S. PATENT DOCUMENTS 6,565,727 B1 5/2003 Shenderov
6,911,132 B2 6/2005 Pamula et al.
(Continued)

FOREIGN PATENT DOCUMENTS

EP 2672260 12/2013

OTHER PUBLICATIONS

Fair, R.B., "Digital microfluids: is a true lab-on-a-chip possible?" Microfluidics and Nanofluidics Jun. 2007, vol. 3, Issue 3, pp. 245-281.
(Continued)

*Primary Examiner* — Jennifer Wecker
(74) *Attorney, Agent, or Firm* — Renner, Otto, Boisselle & Sklar, LLP

(57) ABSTRACT

An electrowetting on dielectric (EWOD) device includes an EWOD device array that applies electrowetting forces and contains a non-polar fluid. A barrier droplet configuration is formed using electrowetting forces to obstruct migration of a species from a first area of the EWOD device array to a protected area of the EWOD device array. A method of operating the EWOD device includes the steps of: dispensing a source droplet into a first area of the EWOD device array, the source droplet containing a migrating species, wherein the EWOD device array includes a second area to be protected from the migrating species; and forming a barrier droplet configuration positioned between the first area and the second area of the EWOD device array that obstructs a migration pathway of the migrating species between the first area and the second area. The barrier droplet configuration includes at least one aqueous or polar barrier droplet, and the migrating species exhibits a preference for either the polar or aqueous environment of the barrier or the non-polar environment of the oil to obstruct migration.

25 Claims, 40 Drawing Sheets

(52) U.S. Cl.
CPC .................. *B01L 2300/0627* (2013.01); *B01L 2400/0427* (2013.01)

(58) Field of Classification Search
CPC ..... B01L 2300/0627; B01L 2300/0645; B01L 2300/0663; B01L 2300/161; B01L 2400/0427; B01L 2400/0627; B01L 3/502792
See application file for complete search history.

(56) References Cited

U.S. PATENT DOCUMENTS

| | | | | |
|---|---|---|---|---|
| 7,163,612 | B2 | 1/2007 | Sterling et al. | |
| 8,653,832 | B2 | 2/2014 | Hadwen et al. | |
| 2009/0107907 | A1 | 4/2009 | Chen et al. | |
| 2009/0311713 | A1* | 12/2009 | Pollack | B01L 7/525 435/287.2 |
| 2011/0091989 | A1 | 4/2011 | Sista et al. | |
| 2012/0006684 | A1* | 1/2012 | Hadwen | G09G 3/348 204/600 |
| 2012/0168309 | A1* | 7/2012 | Heikenfeld | B01L 3/502792 204/518 |
| 2018/0071730 | A1 | 3/2018 | Breinlinger et al. | |

OTHER PUBLICATIONS

Sensors and Actuators B: Chemical Feedback control system for large scale 2D digital microfluidic platforms, Jun. 10, 2017, Chunqiao et al.

* cited by examiner

BARRIER DROPLET CONFIGURATIONS AGAINST MIGRATION BETWEEN DROPLETS ON AM-EWOD DEVICES

TECHNICAL FIELD

The present invention relates to droplet microfluidic devices, and more specifically to Active Matrix Electro-wetting-On-Dielectric (AM-EWOD) devices, and methods to restrict droplet content migration along such devices.

BACKGROUND ART

Electrowetting on dielectric (EWOD) is a well-known technique for manipulating droplets of fluid by the application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R.B. Fair, Microfluid Nanofluid (2007) 3:245-281).

Example configurations and operation of EWOD devices are described in the following. U.S. Pat. No. 6,911,132 (Pamula et al., issued Jun. 28, 2005) discloses a two-dimensional EWOD array to control the position and movement of droplets in two dimensions. U.S. Pat. No. 6,565,727 (Shenderov, issued May 20, 2003) further discloses methods for other droplet operations including the splitting and merging of droplets, and the mixing together of droplets of different materials. U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

The approach of U.S. Pat. No. 7,163,612 may be termed "Active Matrix Electrowetting on Dielectric" (AM-EWOD). There are several advantages in using TFT based thin film electronics to control an EWOD array, namely:

- Electronic driver circuits can be integrated onto the lower substrate 10.
- TFT-based thin film electronics are well suited to the AM-EWOD application. They are cheap to produce so that relatively large substrate areas can be produced at relatively low cost.
- TFTs fabricated in standard processes can be designed to operate at much higher voltages than transistors fabricated in standard CMOS processes. This is significant since many EWOD technologies require electro-wetting voltages in excess of 20V to be applied.

AM-EWOD droplet manipulation devices are a highly desirable platform for automation of chemical and biochemical reactions. Such devices may carry out chemical/biochemical reactions or reaction sequences in multiple steps requiring different droplet manipulations, such as for example dispensing droplets from a reservoir, moving droplets along the array, splitting droplets, mixing droplets, and the like. Accordingly, it is significant that droplet positioning is precisely maintained and controlled, so as to prevent droplet contamination by adjacent droplets and with droplet contact only occurring in a controlled manner in accordance with a given reaction protocol.

There have been attempts to isolate fluid constituents for purposes of performing chemical reactions, but such principles largely have not been applied to AM-EWOD type devices. For example, US 2018/0071730 (Breinlinger et al., published Mar. 15, 2018) pertains to a non-EWOD system using immiscible fluid media to isolate microfluidic structures (pens) in a microfluidic device. In a microfluidic device that incorporates fluidically connected microfluidic structures (storage pens), the pens and channels are filled with a first fluid medium, such as oil, and then a second fluid medium, such as gas or an aqueous medium, is used to obstruct the pen openings to reduce the diffusion of micro-objects or soluble components. US 2009/0107907 (Chen et al., published Apr. 30, 2009) is another non-EWOD system, which relies on diffusion of chemical species from a porous membrane into an aqueous droplet, and the droplet is then analyzed. Such a system treats droplets in oil that is somewhat permeable to affect diffusion. As referenced above, such principles largely have not been applied to AM-EWOD type devices, as droplet manipulation is controlled principally by the electrowetting forces, without a recognized need for additional droplet manipulation mechanisms.

SUMMARY OF INVENTION

Typically, in reaction protocols using AM-EWOD devices, it has been presumed that in the absence of electrowetting forces, droplets remain largely fixed in position, with any migration or leakage of droplet constituents being considered negligible. Accordingly, barrier structures that are used in other analytical fluidic systems, such as pens, channels, or the like, have not been employed on EWOD devices, and in any event would not be suitable for EWOD devices given the size and number of droplets that may be dispensed, and the nature of the droplet manipulation operations. The inventors have found, however, that the presumption of negligible droplet migration or leakage of constituents does not hold true in many significant circumstances. Accordingly, there is a need in the art, that previously has gone unrecognized, for the capability to employ barriers against droplet content migration in an AM-EWOD device.

More particularly, the inventors have found that when an aqueous droplet on an AM-EWOD device is used to store a species for extended periods, under some circumstances there is a tendency for the stored species to migrate into the surrounding medium, and potentially into nearby droplets resulting in droplet contamination. This problem is particularly pronounced when the concentration of the stored species in the original droplet is high. For example, a droplet containing 1:1 v/v formic acid/water, surrounded by oil, has been shown to leak formic acid through the oil and into nearby droplets, lowering the pH of the contaminated droplets in a way that might compromise an ongoing chemical reaction.

To overcome such deficiencies, in accordance with embodiments of the present invention, in an AM-EWOD device electrowetting forces are applied to a droplet to form, as referred to herein, one or more "barrier droplets" to form a barrier droplet configuration that acts as a barrier to trap, obstruct, or otherwise prevent migration of a dissolved or suspended species in a source droplet through the surrounding oil medium. For example, the barrier droplet configuration may be positioned between a droplet containing an acid (the source droplet) and a second droplet whose pH must be kept high. Without the barrier droplet configuration, acid is able to migrate from the source droplet, through the oil, and into the high-pH second droplet. The barrier droplet configuration acts to restrict the migration of acid (or whatever species the source droplet contains) so that high concentrations may be stored on-chip in the presence of, for example, species-sensitive components or other reaction areas on the device array.

In exemplary embodiments, the barrier droplet configuration operates by exploiting a difference in preference of the migrating species for the polar or aqueous environment of the barrier droplet versus the non-aqueous environment of the non-polar fluid (oil). On encountering an oil/water boundary, the migrating species partitions itself between the oil and the water. Consider an example whereby a source droplet containing a high concentration of the migrating species is near an area that must be protected from the migrating species. This protected area may be where a chemical reaction takes place that may be sensitive to the presence of the migrating species, an electronic component that could be damaged by the migrating species, or another droplet or fluid reservoir that stores a reagent of another composition that could be contaminated by the migrating species. At the boundary between the source droplet and the oil, a portion of the migrating species will escape the source droplet and enter the oil. In the absence of a barrier droplet configuration, the migrating species may then move across the oil until the species reaches the area to be protected. If the system is closed, the system may move towards a state of dynamic equilibrium in which the concentration of the migrating species in the area to be protected is unacceptably high.

To prevent contamination of the protected area by the migrating species, a barrier droplet configuration is formed by electrowetting forces in an area of the device array between the source droplet and the protected area. The barrier droplet configuration provides an additional set of oil/water interfaces at which the migrating species population may become partitioned; in the event that the migrating species has a preference for polar or aqueous environments, the barrier will also act as a thermodynamic sink for the migrating species. The barrier droplet thus obstructs a portion of the potential pathways of migration, thereby reducing the rate of migration of the species to the protected area. By reducing the rate at which the migrating species enters the protected area, the useful lifetime of the reaction system on the AM-EWOD device is extended.

To be effective, the barrier droplet configuration should obstruct a significant portion of the potential pathways of migration to the protected area. The obstruction may be performed using a single barrier droplet or an ensemble of a plurality of barrier droplets. To achieve this requisite obstruction without the barrier droplet becoming unmanageably large, electrowetting forces applied by the AM-EWOD device are applied to control the shape of the barrier droplet (s). An AM-EWOD device can be used to prepare a barrier droplet configuration that completely surrounds the source droplet, or otherwise maintains a high aspect ratio in the barrier droplet configuration such that surface tension otherwise renders the barrier droplets unstable in the absence of the electrowetting forces.

For effective obstruction of migration pathways, a concentration of the migrating species in the barrier droplet(s) of the barrier droplet configuration is lower than a concentration of the migrating species in the source droplet. Under such conditions, the rate of migration out of a side of the barrier droplet opposite from the source droplet is lowered simply by dilution effects in accordance with Fick's diffusion laws. Additionally, the effectiveness of the barrier droplet configuration may be enhanced by the changing barrier droplet contents or makeup. Because of the makeup of the migrating species, at the oil/water interface the migrating species may have a preference for one environment over the other. In the case of a preference for non-polar environments, the aqueous barrier droplet will act as a barrier. In the case of a greater preference for the aqueous environment, the barrier droplet will act as a sink, absorbing the migrating species. The oil/water interface on the far side of the barrier droplet from the source droplet will also act as a barrier to migration. Accordingly, an additive to the barrier droplet that increases the strength of a migrating species's existing preference for either aqueous or non-polar media would help to slow its migration through the oil across the EWOD device. In one example, the additive includes a capturing agent, such as for example an adsorbent nanoparticle, that is able to capture the migrating species and physically prevent species migration, or that reacts with the migrating species to convert the species into something whose presence can be tolerated in the region to be protected.

An aspect of the invention, therefore, is a method of operating an electrowetting on dielectric (EWOD) device that includes an EWOD device array that applies electrowetting forces and contains a non-polar fluid, whereby a barrier droplet configuration is formed using electrowetting forces to obstruct migration of a species from a first area of the EWOD device array to a protected area of the EWOD device array. In exemplary embodiments, the method of operating includes the steps of: dispensing a source droplet into a first area of the EWOD device array, the source droplet containing a migrating species, wherein the EWOD device array includes a second area to be protected from the migrating species; and forming a barrier droplet configuration positioned between the first area and the second area of the EWOD device array that obstructs a migration pathway of the migrating species between the first area and the second area. The barrier droplet configuration includes at least one aqueous or polar barrier droplet, and the migrating species exhibits a preference for either the polar or aqueous environment of the barrier or the non-polar environment of the oil. For example, the concentration of a migrating species in the barrier droplet may be lower than the concentration of a migrating species in the source droplet. The barrier droplet may include an additive that increases the preference of the migrating species for the environment of the barrier droplet relative to the non-polar fluid, such as for example a capturing agent that reacts with or binds to the migrating species, or converts the migrating species into another form. The barrier droplet configuration may include a variety of numbers, shapes, and positionings of one or more barrier droplets, and in exemplary embodiments the barrier droplet (s) may be combined with one or more additional barrier elements that are not barrier droplets formed using the electrowetting forces.

The EWOD device may be operated by: dispensing a first droplet into a first area of the EWOD device array; dispensing a second droplet into a second area of the EWOD device array; forming a barrier droplet configuration; wherein the barrier droplet configuration comprises a first portion that separates the first area from the second area, and a second portion that separates both the first and second areas from a third area of the EWOD device array; maintaining the first portion of the barrier droplet configuration during a first stage of a reaction protocol, thereby obstructing a migration pathway between the first area and the second area during said first stage; and retracting the first portion of the barrier droplet configuration during a second stage of the reaction protocol, thereby opening the migration pathway between the first area and the second area to permit interaction of the first droplet and the second droplet during said second stage. The method further may include applying electrowetting voltages to the EWOD device array during the second stage of the reaction protocol to mix the first droplet and the second droplet.

According to another aspect of the invention, a microfluidic system includes an electro-wetting on dielectric (EWOD) device comprising an element array configured to receive one or more liquid droplets, the element array comprising a plurality of individual array elements; and a control system configured to control actuation voltages applied to the element array to perform manipulation operations as to the liquid droplets to perform the methods of operating the EWOD device that include forming a barrier droplet configuration. The microfluidic system further may include integrated impedance sensing circuitry that is integrated into the array elements of the EWOD device, and a configuration and position of source and barrier droplets dispensed onto the array elements is determined based on an impedance sensed by the impedance sensing circuitry. Another aspect of the invention is a non-transitory computer-readable medium storing program code which is executed by a processing device for controlling actuation voltages applied to array elements of an element array of an electro-wetting on dielectric (EWOD) device for performing droplet manipulations on droplets on the element array, the program code being executable by the processing device to perform steps of the methods of operating the EWOD device that include forming a barrier droplet configuration.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DESCRIPTION OF EMBODIMENTS

Figure 1:
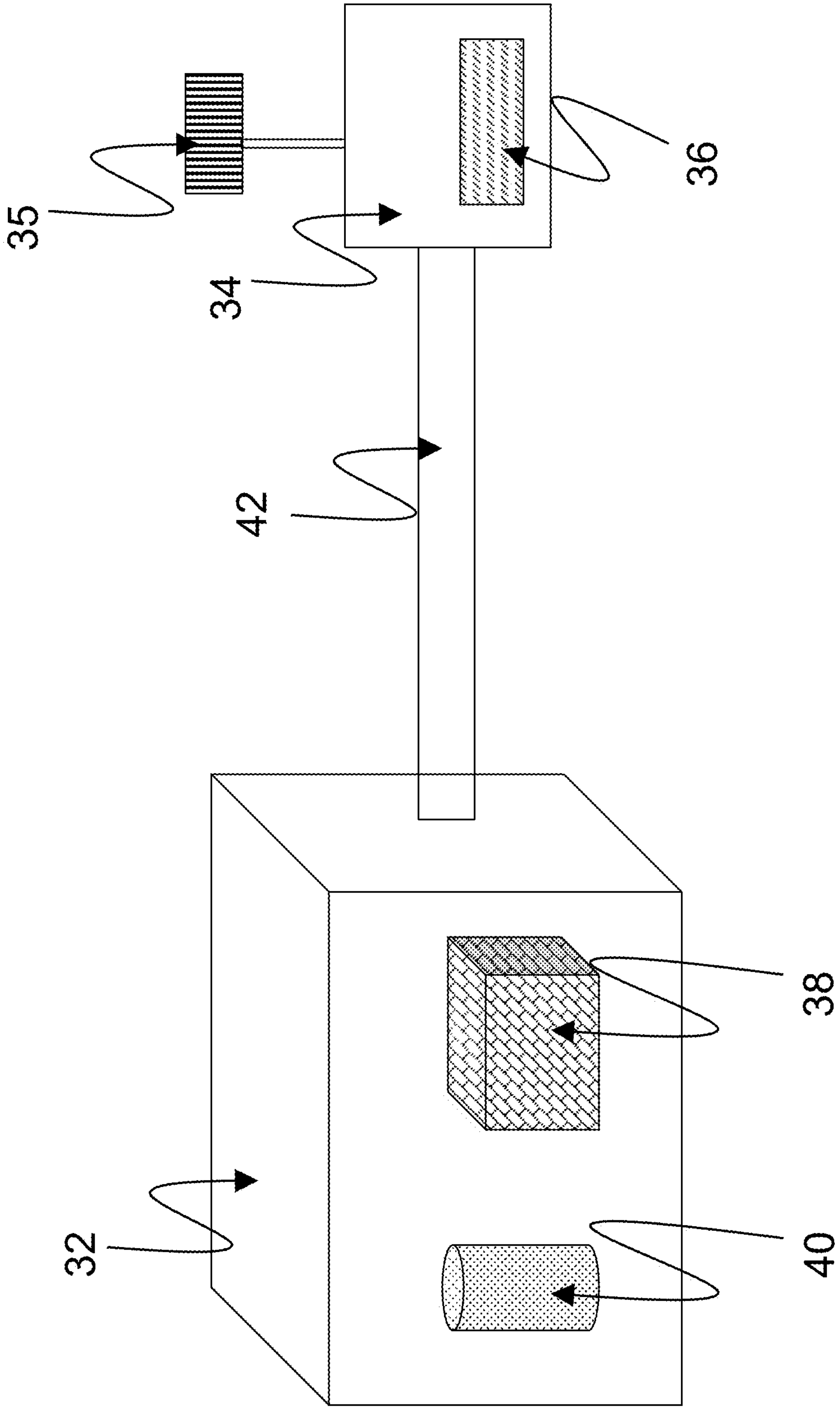
FIG. 1 is a drawing depicting an exemplary EWOD based microfluidic system that may be used to perform methods according to embodiments of the present invention.

The present invention pertains to a microfluidic system including in an AM-EWOD device by which electrowetting forces are applied to a liquid reservoir to form a barrier droplet configuration to act as a barrier to trap, obstruct, or otherwise prevent migration of a dissolved or suspended species in a source droplet through the surrounding oil medium. FIG. 1 is a drawing depicting an exemplary EWOD based microfluidic system that may be used to perform methods according to embodiments of the present invention. In the example of FIG. 1, the measurement system includes a reader 32 and a cartridge 34. The cartridge 34 may contain a microfluidic device, such as an EWOD or AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software any data associated with the system. The control electronics 38 may include suitable circuitry and/or processing devices that are configured to carry out various control operations relating to control of the AM-EWOD device 36, such as a CPU, microcontroller or microprocessor.

Among their functions, to implement the features of the present invention, the control electronics may comprise a part of the overall control system that may execute program code embodied as a control application within the storage device 40. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 40 may be configured as a non-transitory computer readable medium, such as random access memory (RAM), a read-only memory (ROM), an erasable programmable read-only memory (EPROM or Flash memory), or any other suitable medium. Also, while the code may be executed by control electronics 38 in accordance with an exemplary embodiment, such control system functionality could also be carried out via dedicated hardware, firmware, software, or combinations thereof, without departing from the scope of the invention.

The control system may be configured to perform some or all of the following functions:

- Define the appropriate timing signals to manipulate liquid droplets on the AM-EWOD device 36.
- Interpret input data representative of sensor information measured by a sensor or sensor circuitry associated with the AM-EWOD device 36, including computing the locations, sizes, centroids and perimeters of liquid droplets on the AM-EWOD device 36.
- Use calculated sensor data to define the appropriate timing signals to manipulate liquid droplets on the AM-EWOD device 36, i.e. acting in a feedback mode.
- Provide for implementation of a graphical user interface (GUI) whereby the user may program commands such as droplet operations (e.g. move a droplet), assay operations (e.g. perform an assay), and the GUI may report the results of such operations to the user.
- In accordance with embodiments of the present invention, and as further detailed below, the control system may control the application of actuation voltages to form various barrier droplet configurations.

In the example of FIG. 1, an external sensor module 35 may be provided for sensing droplet properties. For example, optical sensors as are known in the art may be employed as external sensors for sensing droplet properties. Suitable optical sensors include camera devices, light sensors, charged coupled devices (CCDs) and image similar image sensors, and the like. A sensor alternatively may be configured as internal sensor circuitry incorporated as part of the drive circuitry in each array element. Such sensor circuitry may sense droplet properties by the detection of an electrical property at the array element, such as impedance or capacitance.

The control system, such as via the control electronics 38, may supply and control the actuation voltages applied to the electrode array of the microfluidics device 36, such as required voltage and timing signals to perform droplet manipulation operations and sense liquid droplets on the AM-EWOD device 36. The control electronics further may execute the application software to generate and output control voltages for droplet sensing and performing sensing operations. The reader 32 and cartridge 34 may be electrically connected together while in use, for example by a cable of connecting wires 42, although various other methods (e.g. wireless connection) of providing electrical communication may be used as are known to those of ordinary skill in the art.

Figure 2:
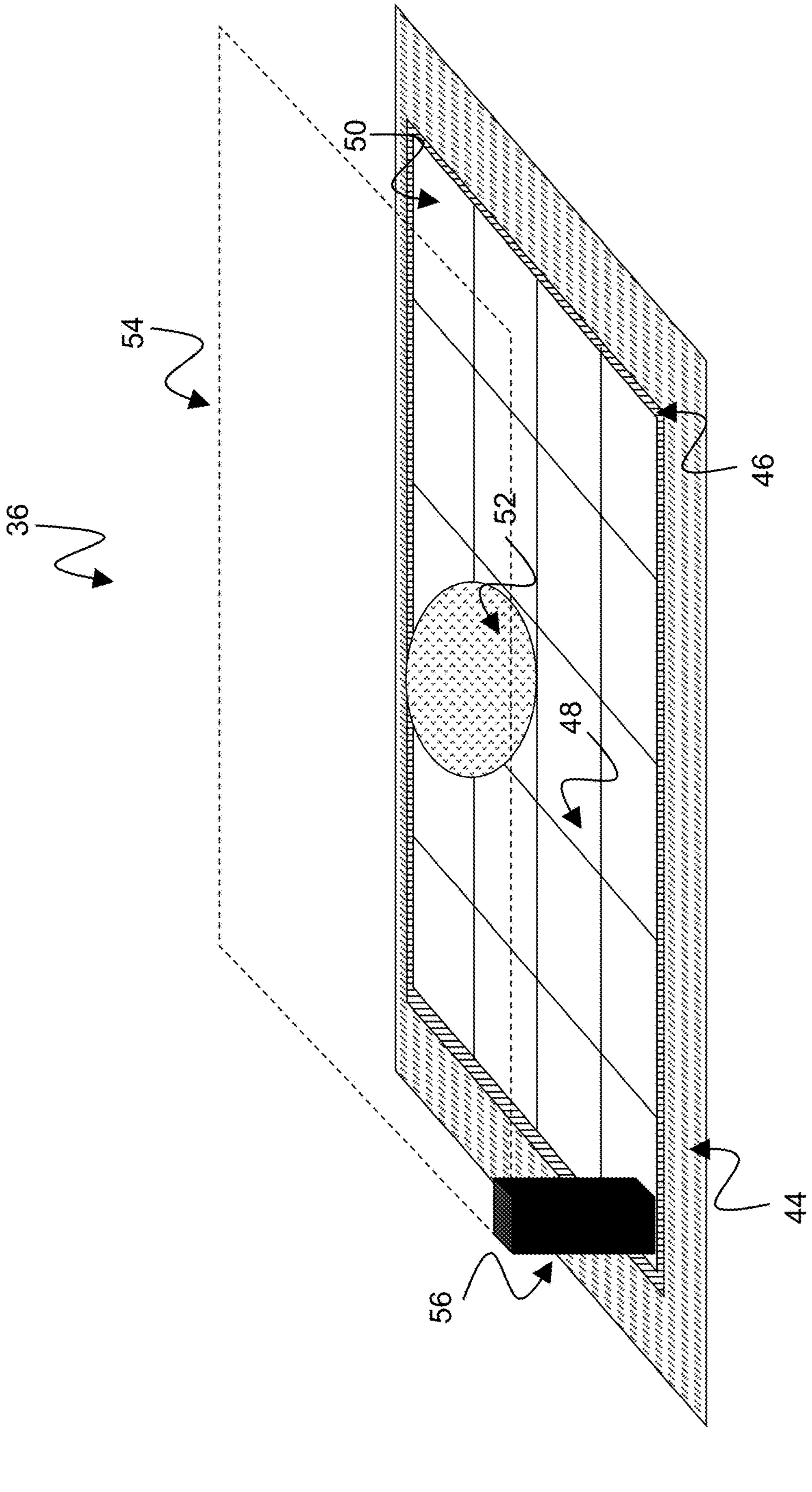
FIG. 2 is a drawing depicting an exemplary AM-EWOD device in schematic perspective that may be used to perform methods according to embodiments of the present invention.

FIG. 2 is a drawing depicting additional details of the exemplary AM-EWOD device 36 in schematic perspective. The AM-EWOD device 36 has a lower substrate 44 with thin film electronics 46 disposed upon the lower substrate 44. The thin film electronics 46 are arranged to drive array element electrodes 48. A plurality of array element electrodes 48 are arranged in an electrode or element array 50, having X by Y array elements where X and Y may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

Figure 3:
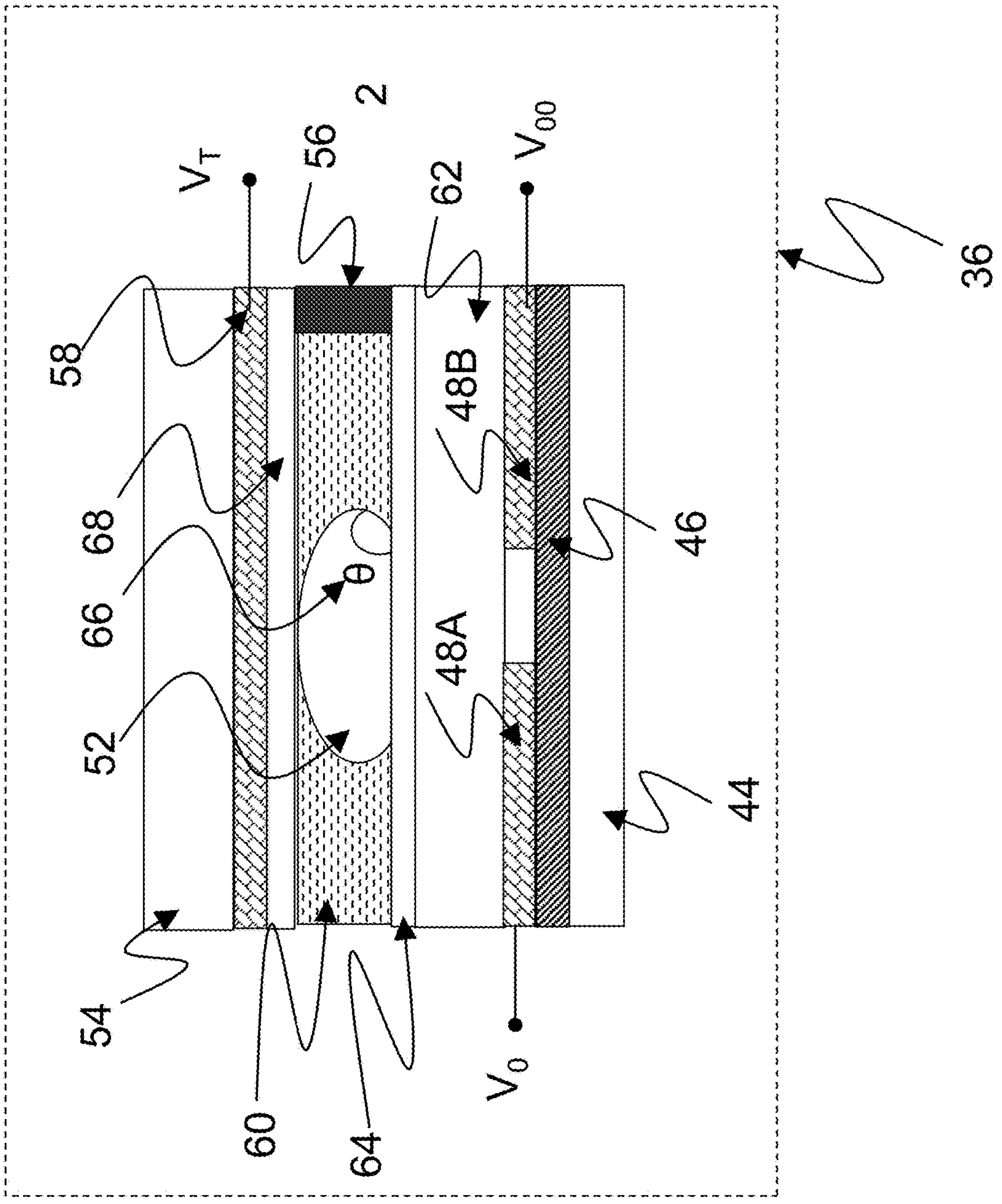
FIG. 3 is a drawing depicting a cross section through some of the array elements of the exemplary AM-EWOD device of FIG. 2.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 2. The device configuration is similar to the conventional configuration shown in FIG. 1, with the AM-EWOD device 36 further incorporating the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

Figure 4A:
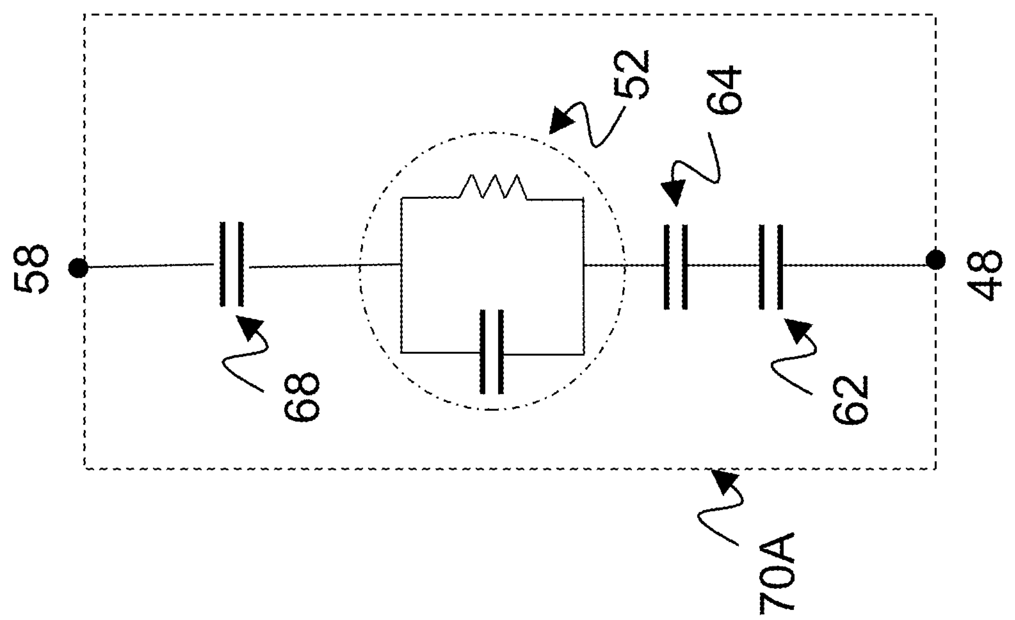
FIG. 4A is a drawing depicting a circuit representation of the electrical load presented at the element electrode when a liquid droplet is present.

FIG. 4A shows a circuit representation of the electrical load 70A between the element electrode 48 and the reference electrode 58 in the case where a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ≠80 if the liquid droplet is aqueous). In many situations the droplet resistance is relatively small, such that at the frequencies of interest for electro-wetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

Figure 4B:
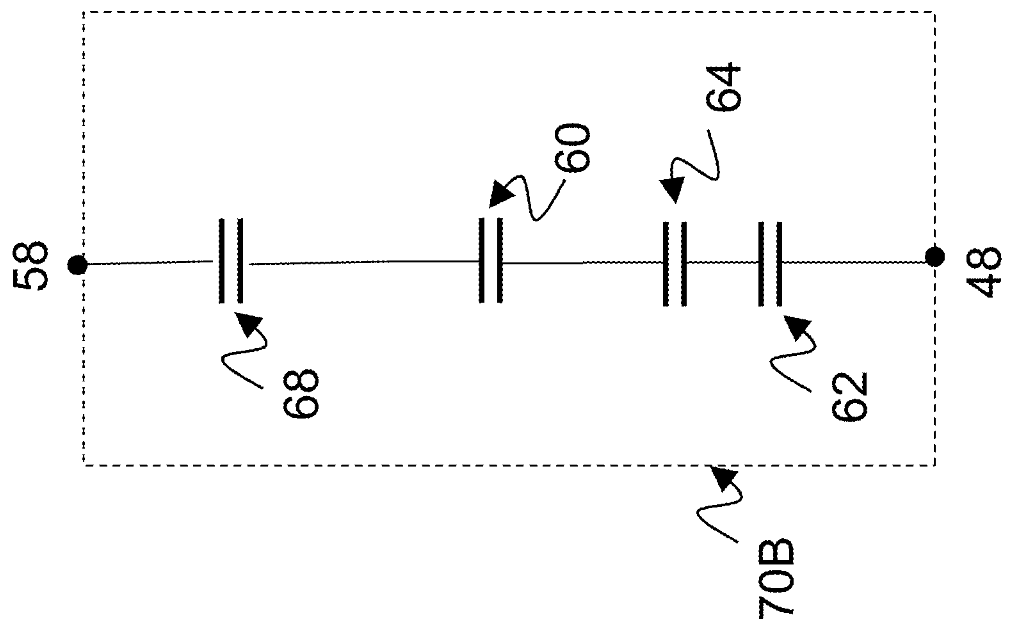
FIG. 4B is a drawing depicting a circuit representation of the electrical load presented at the element electrode when no liquid droplet is present.

FIG. 4B shows a circuit representation of the electrical load 70B between the element electrode 48 and the reference electrode 58 in the case where no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, of the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

Figure 5:
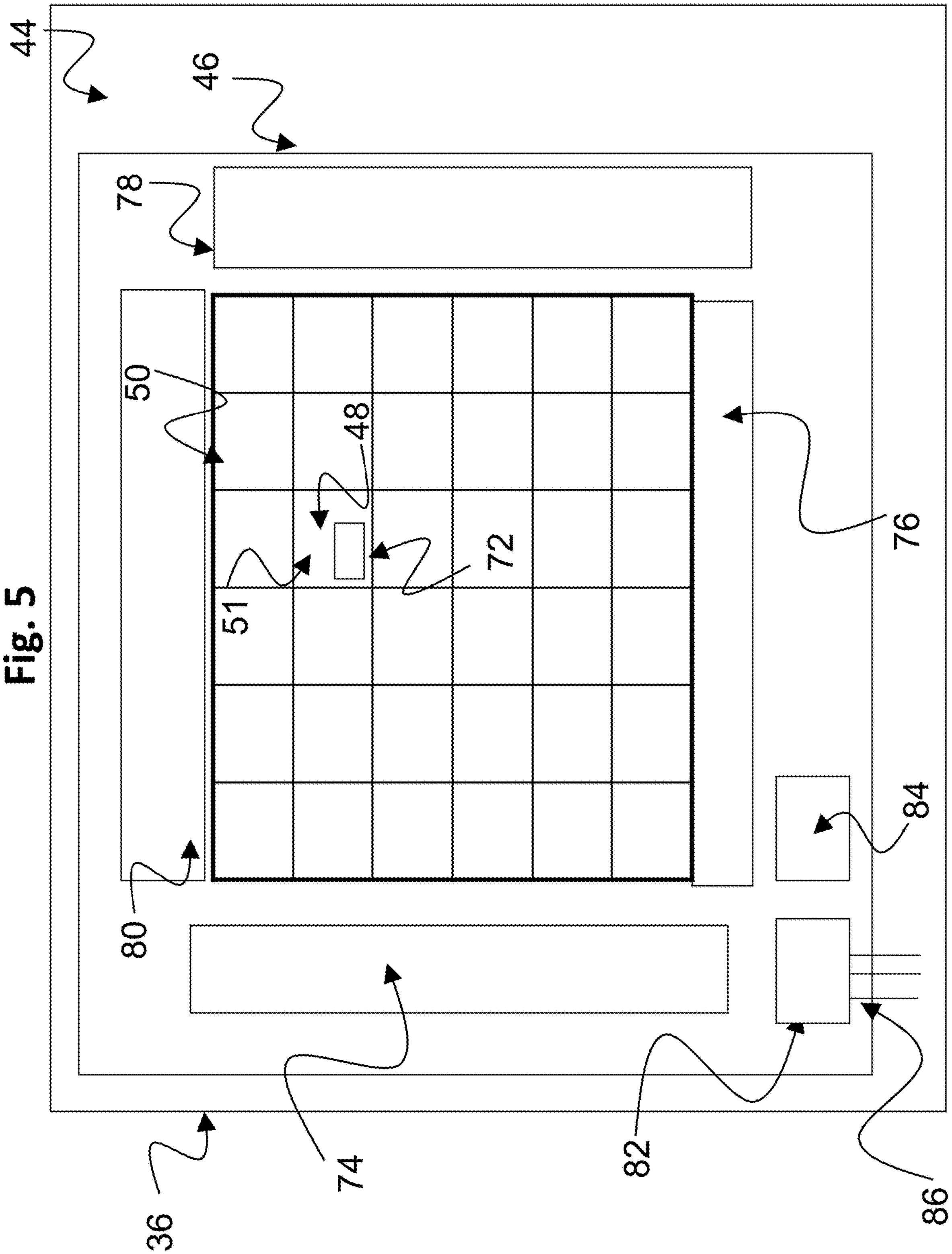
FIG. 5 is a drawing depicting an exemplary arrangement of thin film electronics in the exemplary AM-EWOD device of FIG. 2.

FIG. 5 is a drawing depicting an exemplary arrangement of thin film electronics 46 in the exemplary AM-EWOD device 36 of FIG. 2 in accordance with embodiments of the present invention. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensing capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in Liquid Crystal Display driving circuitry.

Generally, an exemplary AM-EWOD device 36 that includes thin film electronics 46 may be configured as follows. The AM-EWOD device 36 includes the reference electrode 58 mentioned above (which, optionally, could be an in-plane reference electrode) and a plurality of individual array elements 51 on the array of elements 50, each array element 51 including an array element electrode 48 and array element circuitry 72. Relatedly, the AM-EWOD device 36 may be configured to perform a method of actuating the array elements to manipulate liquid droplets on the array by controlling an electro-wetting voltage to be applied to a plurality of array elements. The applied voltages may be provided by operation of the control system described as to FIG. 1, including the control electronics 38 and applications and data stored on the storage device 40. The electro-wetting voltage at each array element 51 is defined by a potential difference between the array element electrode 48 and the reference electrode 58. The method of controlling the electro-wetting voltage at a given array element typically includes the steps of supplying a voltage to the array element electrode 48, and supplying a voltage to the reference electrode 58, by operation of the control system.

Figure 6:
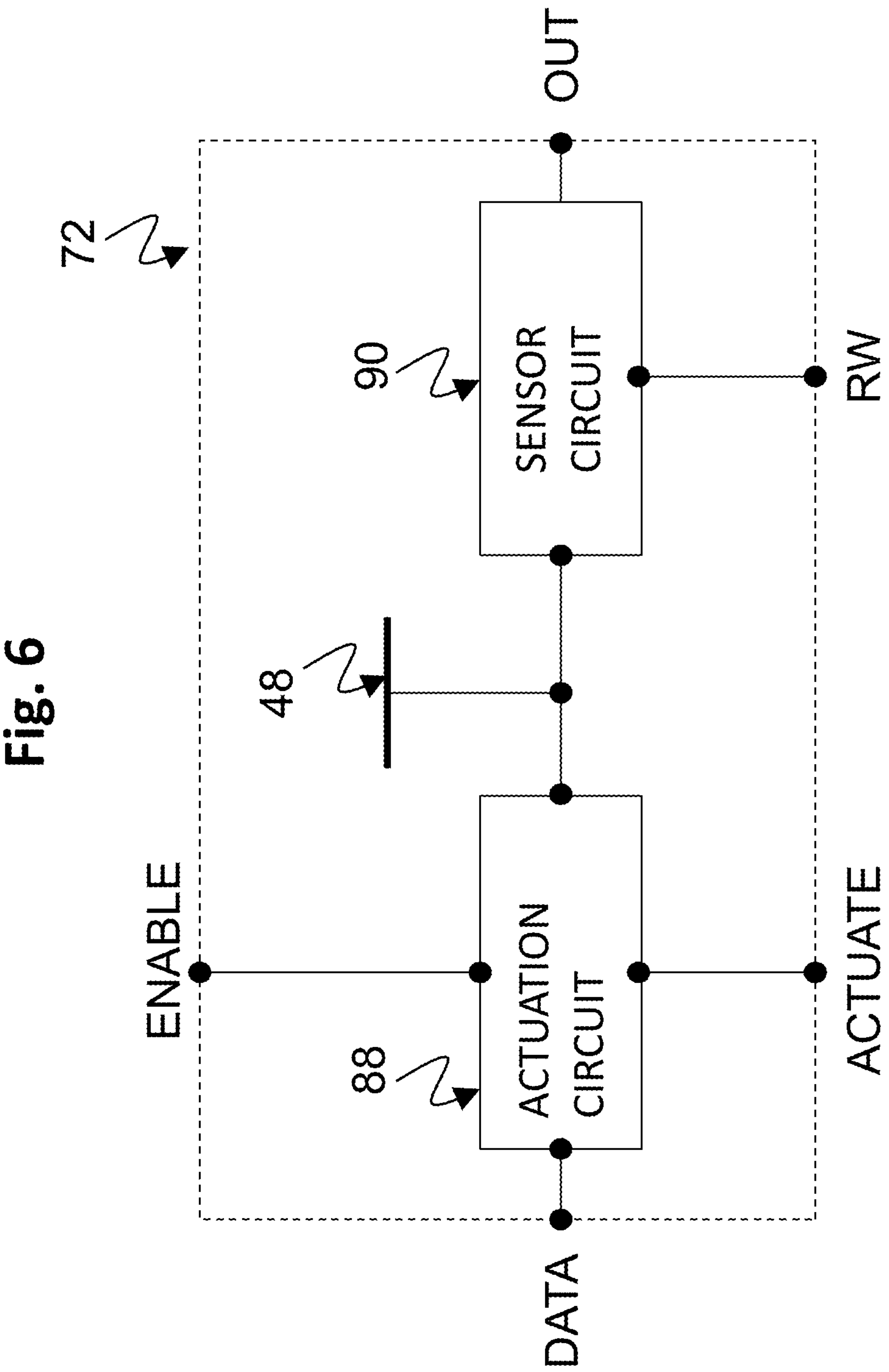
FIG. 6 is a drawing depicting an exemplary arrangement of array element circuitry that may be part of the thin film electronics of FIG. 5.

FIG. 6 is a drawing depicting an exemplary arrangement of the array element circuit 72 present in each array element 51, which may be used as part of the thin film electronics of FIG. 5. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:

(i) Selectively actuating the element electrode 48 by supplying a voltage to the array element electrode. Accordingly, any liquid droplet present at the array element 51 may be actuated or de-actuated by the electro-wetting effect.

(ii) Sensing the presence or absence of a liquid droplet at the location of the array element 51. The means of sensing may be capacitive or impedance, optical, thermal or some other means. Capacitive or impedance sensing may be employed conveniently and effectively using an integrated impedance sensor circuit as part of the array element circuitry.

Exemplary configurations of array element circuits 72 including integrated impedance sensor circuitry are known in the art, and for example are described in detail in U.S. Pat. No. 8,653,832 referenced in the background art section, and commonly assigned UK application GB1500261.1, both of which are incorporated here by reference. These patent documents include descriptions of how the droplet may be actuated (by means of electro-wetting) and how the droplet may be sensed by integrated capacitive or impedance sensing circuitry. Typically, capacitive and impedance sensing may be analogue and may be performed simultaneously, or near simultaneously, at every element in the array. By processing the returned information from such a sensor (for example in the application software in the storage device 40 of the reader 32), the control system described above can determine in real-time, or almost real-time the position, size or volume, centroid and perimeter of each liquid droplet present in the array of elements 50. As referenced in connection with FIG. 2, an alternative to sensor circuitry is to provide an external sensor (e.g., sensor 35), such as an optical sensor that can be used to sense droplet properties.

As referenced above, the present invention pertains to a microfluidic system including in an AM-EWOD device by which electrowetting forces are applied to a fluid reservoir to form a barrier droplet configuration to act as a barrier to trap, obstruct, or otherwise prevent migration of a dissolved or suspended species in a source droplet through the surrounding non-polar fluid (oil) medium. The following terms are used herein.

A "migrating species" is any dissolved chemical species, ion, molecule, or suspended particle, that is able to migrate by any means, including diffusion, out of a source droplet in which the species is originally located, through the surrounding non-polar fluid (oil), and thereby potentially into other droplets, structures, or other protected areas on the EWOD device that could be contaminated or damaged by the migrating species. The migrating species may have a preference for the polar or aqueous environment of the barrier droplet, or instead for the non-polar environment of the non-polar fluid (oil). The preference of the migrating species may be defined as having a partition coefficient between the two phases that is not equal to one.

A "barrier droplet" is a polar or aqueous droplet dispensed on an EWOD device from a fluid reservoir that obstructs a large proportion of potential pathways of migration of the migrating species. In exemplary embodiments, the migrating species has a high affinity for residence in the barrier droplet as compared to the surrounding oil, or for residence in the surrounding oil as compared to the barrier droplet, and this affinity may be further enhanced by the presence in the barrier droplet of one or more additives such as capturing agents. The barrier droplet's shape or position may be held constant by the selective actuation of corresponding array elements of the EWOD device. The EWOD device also may be used to reposition or reshape the barrier droplet, or to open and shut passages to allow or prevent the movement of the migrating species, or to merge with other droplets including other barrier droplets. The barrier droplet may be formed and manipulated in such manners as a single barrier droplet or as part of an ensemble of a plurality of barrier droplets.

A "barrier droplet configuration" is an arrangement that includes one or more barrier droplets, and optionally further may include additional barrier elements that are not barrier droplets.

A "capturing agent" is any chemical species, suspended particle or surface coating that may be located within the barrier droplet, that is able to restrict or prevent migration of the migrating species by reacting with, binding to, or removing the migrating species, or by converting the migrating species to another form. Examples of capturing agents may include magnetic beads, chemical scavengers, chelating agents, nanoparticles, ion exchange resins, supramolecular cages, pH buffers, microorganisms or the like.

As referenced above, AM-EWOD device electrowetting forces are applied to a fluid reservoir to form a barrier droplet configuration to act as a barrier to trap, obstruct, or otherwise prevent migration of a dissolved or suspended species in a source droplet through the surrounding oil medium. For example, the barrier droplet configuration may be positioned between a source droplet containing an acid and a second droplet whose pH must be kept high. Without the barrier droplet configuration, acid is able to migrate from the source droplet, through the oil, and into the high-pH second droplet. The barrier droplet configuration acts to restrict the migration of acid (or whatever migrating species the source droplet contains) so that high concentrations of the migrating species may be stored on-chip in the presence of, for example, species-sensitive components or reaction areas on the device array.

The barrier droplet configuration operates by exploiting a difference in preference of the migrating species for the polar or aqueous environment of the barrier droplet versus the non-aqueous environment of the non-polar fluid (oil). On encountering an oil/water boundary at an aqueous barrier droplet, the migrating species partitions itself between the oil and the water. Consider an example whereby a source droplet containing a high concentration of the migrating species is near an area that must be protected from the migrating species. This protected area may be where a chemical reaction takes place that may be sensitive to the presence of the migrating species, an electronic component that could be damaged by the migrating species, or another droplet or fluid reservoir that stores a reagent or another composition that may be contaminated by the migrating species. At the boundary between the source droplet and the oil, a portion of the migrating species will escape the source droplet and enter the oil. In the absence of a barrier droplet configuration, the migrating species may then move across the oil until the species reaches the area to be protected. If the system is closed, over time a state of dynamic equilibrium may be reached in which the concentration of the migrating species in the area to be protected is unacceptably high.

To prevent contamination of the protected area by the migrating species, a barrier droplet configuration is formed by electrowetting forces and positioned between the source droplet and the protected area. For effective obstruction of migration pathways, a concentration of the migrating species in the barrier droplet(s) of the barrier droplet configuration is lower than a concentration of the migrating species in the source droplet. Under such condition, the rate of migration out of a side of the barrier droplet opposite from the source droplet is lowered simply by dilution effects in accordance with Fick's diffusion laws. The barrier droplet configuration thus provides an additional set of oil/water interfaces, and may act as an additional thermodynamic sink for the migrating species, and obstructs a portion of the potential pathways of migration, thereby reducing the rate of migration of the species to the protected area. By reducing the rate at which the migrating species enters the protected area, the useful lifetime of the reaction system on the AM-EWOD device is extended.

To be effective, the barrier droplet configuration should obstruct a significant portion of the potential pathways of migration to the protected area. The obstruction may be performed using a single barrier droplet or an ensemble of a plurality of barrier droplets. To achieve this requisite obstruction without the barrier droplet(s) becoming unmanageably large, electrowetting forces applied by the AM-EWOD device are applied to control the shape and position of the barrier droplet(s) that form the barrier droplet configuration. An AM-EWOD device can be used to prepare a barrier droplet configuration that completely surrounds the source droplet, or otherwise maintains a high aspect ratio in the barrier droplet configuration such that surface tension otherwise renders the barrier droplet(s) unstable in the absence of the electrowetting forces. The barrier droplet configuration may be formed using structures and devices described with respect to FIGS. 1-6, including for example any control electronics and circuitry, sensing capabilities, and control systems including any processing device that executes computer application code stored on a non-transitory computer readable medium. The following figures illustrate various methods and configurations of forming and manipulating barrier droplet configurations. It will be appreciated that the following examples are not intended to be exhaustive, and other barrier droplet configurations may be employed.

Figure 7:
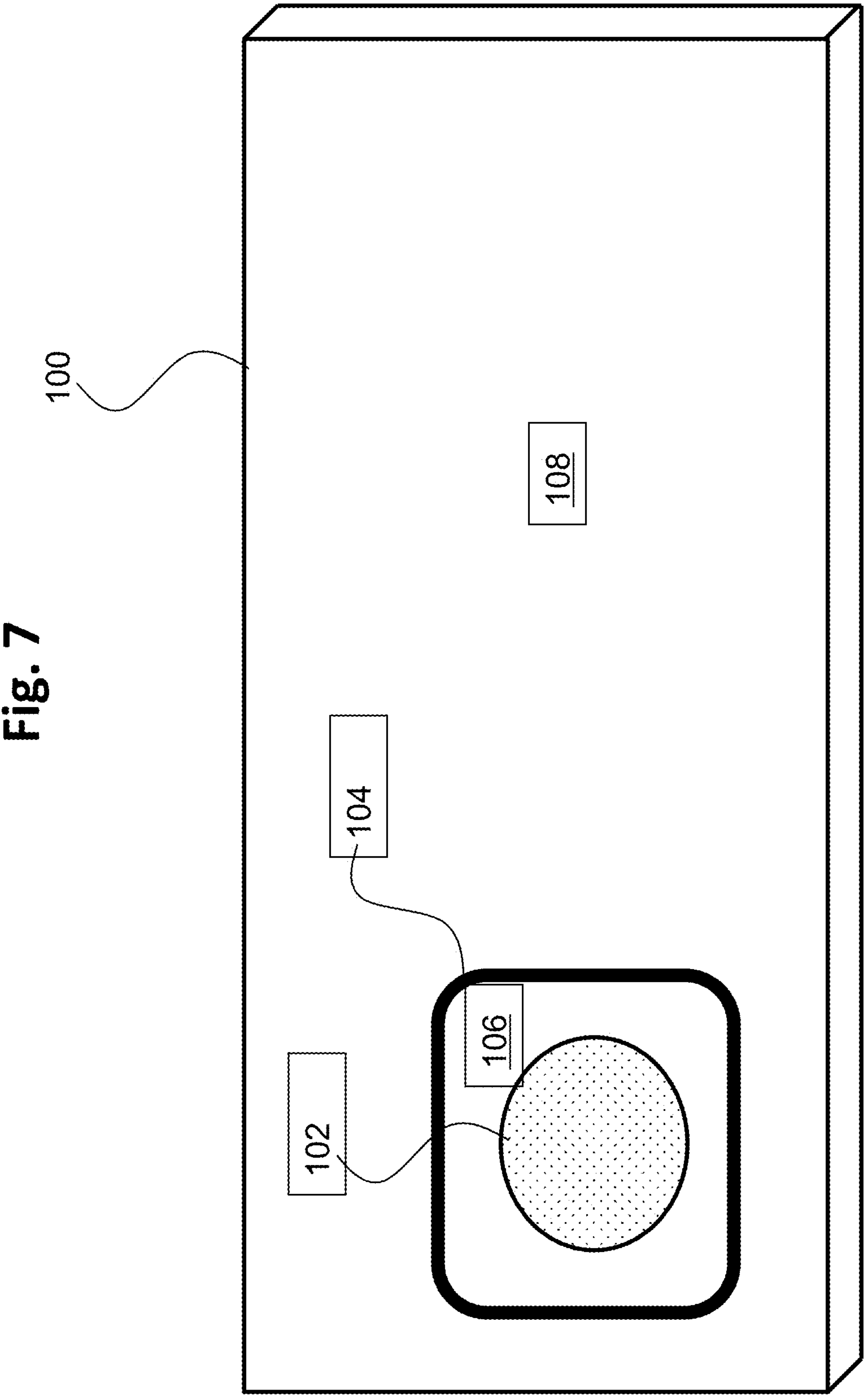
FIG. 7 is a drawing depicting a first barrier droplet configuration that completely surrounds an EWOD device area.

FIG. 7 is a drawing depicting a first barrier droplet configuration, as illustrated with respect to a generalized depiction of an EWOD device array 100. For simplicity, details of the structure the EWOD device array 100 are omitted, but again, the EWOD device array may be configured and controlled as described above with respect to FIGS. 1-6. FIG. 7 further illustrates a first droplet 102 and a barrier droplet 104 that is configured to restrict migration of a migrating species. In this example, the first droplet 102 is isolated from the rest of the EWOD device array 100 by a barrier droplet 104 that completely surrounds the first droplet 102, thereby forming a first area 106 on the EWOD device array and a second area 108 on the EWOD device array that are separated from each other by the barrier droplet 104. The configuration of the barrier droplet in this and subsequent embodiments, including shape and position, is formed using the electrowetting forces that are generated by the EWOD device array 100. Such configuration generally is unstable, and the barrier droplet will therefore revert to a native state (essentially ellipsoid) when the electrowetting force is removed. In addition, electrowetting forces may be applied to reconfigure the shape and positioning of the barrier droplet as needed to protect other areas of the EWOD device array, and/or to remove the barrier effect without affecting other droplets as warranted.

The first droplet 102 may be a source droplet that contains a high concentration of a migrating species, or a group of such source droplets. In such case, the second area 108 is a protected area that is protected from the migrating species that otherwise can migrate from the first droplet 102 through the first area 106. Conversely, the first area 106 may be the protected area, whereby the first droplet 102 may be a droplet in said protective area that must be separated by the barrier droplet from a migrating species that migrates from the second area 108. In this embodiment, because the barrier droplet 104 completely surrounds the first droplet 102, the barrier droplet obstructs all possible migration pathways between the first and second areas 106, 108 of the EWOD device array 100. Accordingly, when the first droplet 102 is the source droplet, the second area 108 of the EWOD device array 100 is protected against migration out of the source droplet 102. The barrier droplet and its contents may be static, or may be moved either separately or in unison. Electrowetting forces may be used to maintain the shape and/or position of the barrier droplet. By use of electrowetting patterns, it further is possible to open and close the barrier droplet 104, which allows the migration to be turned on and off or channeled in a particular manner as between different areas of the EWOD device array.

Figure 8:
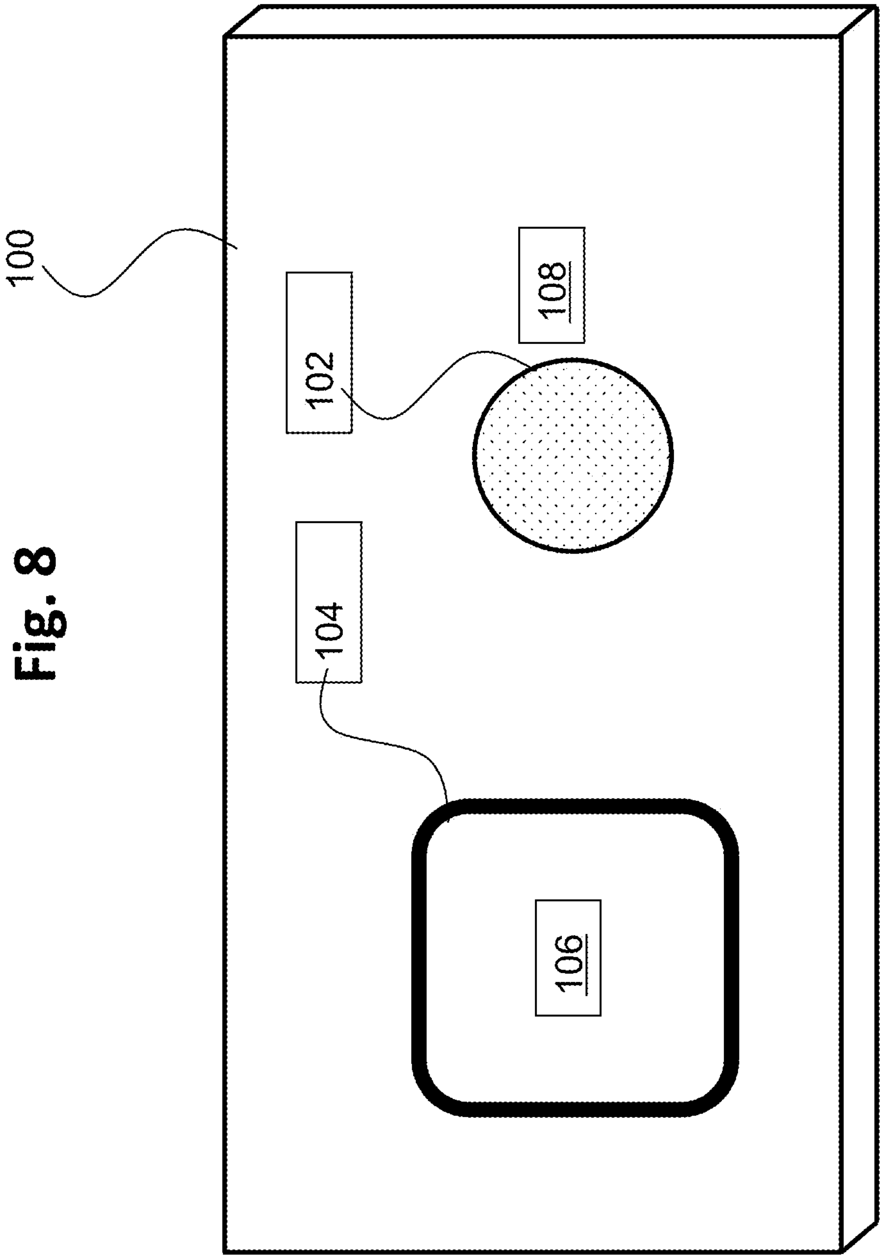
FIG. 8 is a drawing depicting a second barrier droplet configuration that is a variation of FIG. 7.

FIG. 8 is a drawing depicting a second barrier droplet configuration. In this example configuration, the first droplet 102 is located in the second area 108 of the EWOD device. The barrier droplet 104 thus completely surrounds the first area 106, such that in the event the droplet 102 constitutes a source droplet having a migrating species, the first area 106 is a protected area relative to the second area 108 containing the source droplet. As a protected area, the first area 106 is fully enclosed by the barrier droplet 104 and may contain another droplet, or a structure or component of the EWOD device, to be protected from the migrating species. The source droplet 102 may be any droplet or combination of droplets containing one or more migrating species that is able to migrate through the oil. Similarly as in the previous embodiment, because the barrier droplet 104 completely surrounds the first area 106, the barrier droplet obstructs all possible migration pathways between the first and second areas 106, 108 of the EWOD device array 100. Also as in the previous embodiment, and in all subsequent embodiments, the barrier droplet and its contents may be static, or may be moved either separately or in unison. Electrowetting forces further may be used to maintain the shape and/or position of the barrier droplet. By use of electrowetting patterns, it further is possible to open and close the barrier droplet, which allows the migration to be turned on and off or channeled in a particular manner as between different areas of the EWOD device array.

As referenced above, a concentration of the migrating species in the barrier droplet(s) of a barrier droplet configuration is lower than a concentration of the migrating species in the source droplet. Under such condition, the rate of migration out of a side of the barrier droplet opposite from the source droplet is lowered simply by dilution effects in accordance with Fick's diffusion laws. Additionally, the effectiveness of the barrier droplet may be enhanced by changing barrier droplet contents or makeup. Because of the make-up of the migrating species, at the oil/water interface of the aqueous barrier droplet, the migrating species will partition itself between the barrier droplet and the surrounding oil. Accordingly, an additive that enhances the preference for an aqueous medium relative to the non-polar fluid (oil), or enhances the preference for an oil medium over a polar or aqueous one, aids to slow migration through the oil across the EWOD device. For example:

- In the case of a migrating species that has a preference for aqueous environments, a high-pH barrier droplet might deprotonate acidic molecules, making them more ionic and therefore more stable in aqueous media. Conversely, a low-pH barrier droplet might protonate a species, retarding the migration.
- A barrier droplet may contain a substance that acts as a capturing agent, such as for example an adsorbent nanoparticle, that is able to capture the migrating species and physically prevent species migration.
- The barrier droplet may contain a substance that reacts with the migrating species to convert the species into something whose presence can be tolerated in the region to be protected.

By merging the barrier droplet with other droplets containing a capturing agent or other additive, a supply of the additive or capturing agent in the barrier droplet may be replenished, as the supply may become depleted over time as the concentration of migrating species in the barrier droplet increases. This strategy allows a reduction in the concentration of the additive or capturing agent that must be stored in the barrier droplet, which may be beneficial if the additive or capturing agent itself poses a migration risk.

Figure 9:
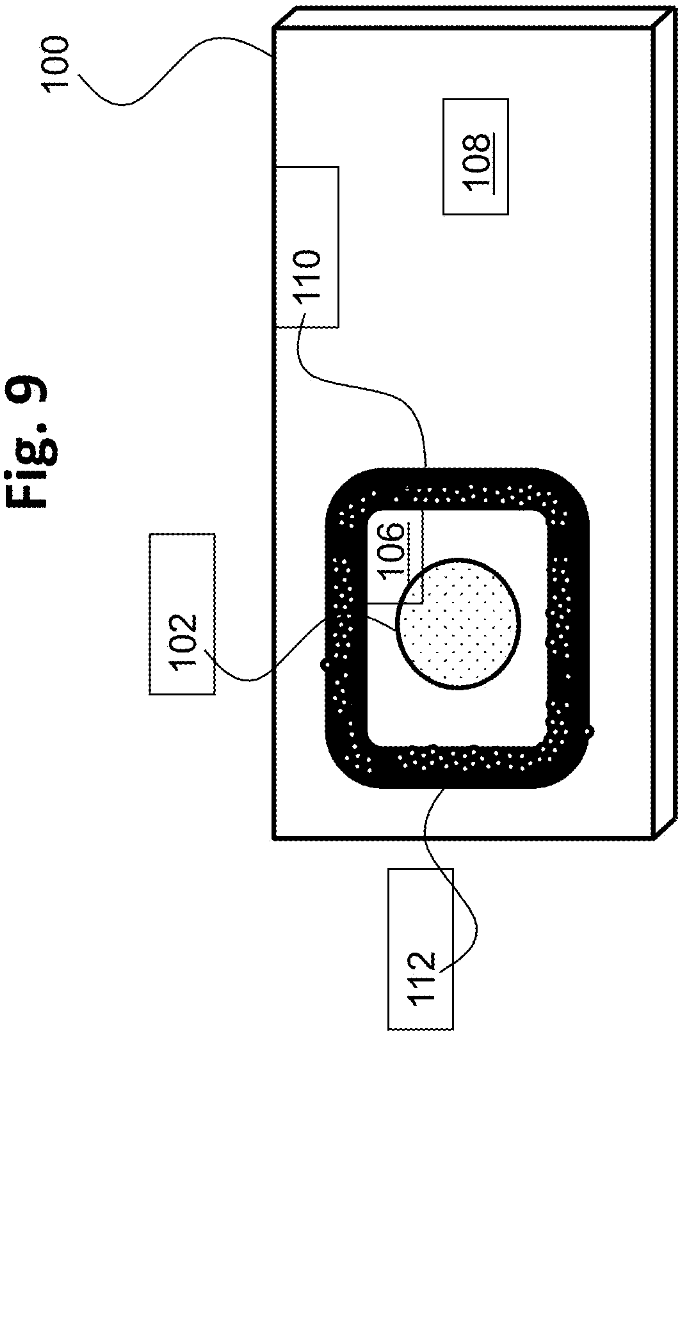
FIG. 9 is a drawing depicting a third barrier droplet configuration that includes an additive such as a capturing agent.

In accordance with such features, FIG. 9 is a drawing depicting a third barrier droplet configuration that is comparable to the embodiment of FIG. 7, in which a barrier droplet 110 further includes a capturing agent or other additive 112. In this embodiment, the first droplet 102 located in the first area 106 of the EWOD device is isolated from the rest of the EWOD device (second area 108) by a barrier droplet 110 that completely surrounds the first droplet 102. In this example, the barrier droplet 110 contains one or more capturing agents 112 that react with or bind to a migrating species, or otherwise convert the migrating species into another form. Again in this embodiment, because the barrier droplet 110 completely surrounds the first droplet 102, the barrier droplet obstructs all possible migration pathways between the first and second areas 106, 108 of the EWOD device array 100. The first droplet 102 may be a source droplet that contains a high concentration of a migrating species, or a group of such source droplets. In such case, the second area 108 is a protected area that is protected from migrating species that can migrate from the first droplet 102 through the first area 106. Conversely, the first area 106 may be the protected area, whereby the first droplet 102 may be a droplet in said protective area that must be separated by the barrier droplet from a migrating species that migrates from the second area 108. In addition, although this embodiment has been described principally in connection with the use of a capturing agent, the substance 112 may be any additive that adjusts the preference for an aqueous or non-aqueous media that would help to slow migration through the oil and across the EWOD device.

Figure 10:
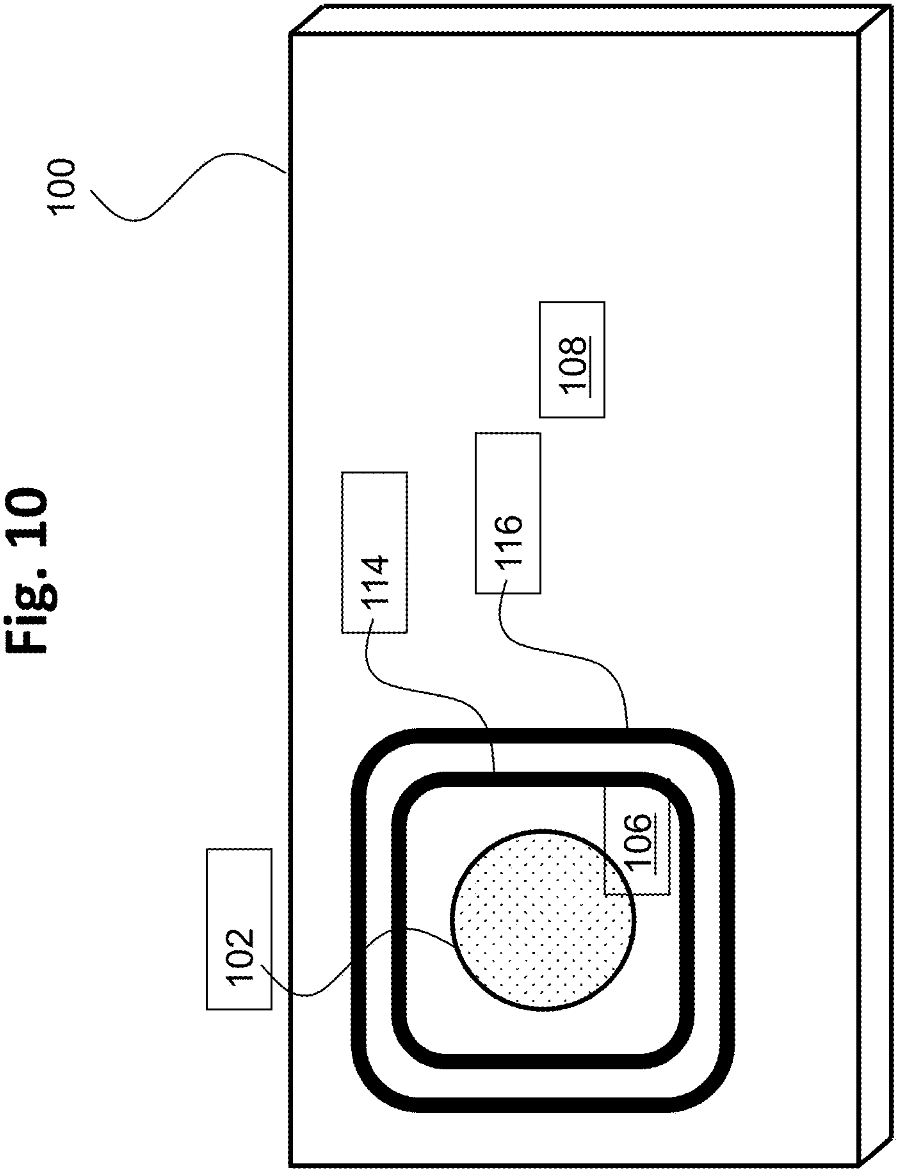
FIG. 10 is a drawing depicting a fourth barrier droplet configuration including a double layer of barrier droplets.

FIG. 10 is a drawing depicting a fourth barrier droplet configuration that employs an ensemble of a plurality of barrier droplets, including in this example a first barrier droplet 114 and a second barrier droplet 116. The use of multiple barrier droplets provides enhanced obstruction of the migration pathways. For this configuration, the first barrier droplet 114 and the second barrier droplet 116 are concentric barrier droplets to isolate the first area 106 from the second area 108 of the EWOD device. As in previous embodiments, the first droplet 102 may be a source droplet containing a high concentration of a migrating species, or a group of source droplets, or be another droplet or a device structure that must be protected from migrating species from outside the barrier droplets. The makeup or contents of the individual barrier droplets may be the same or different from one another. In addition, one or more of the barrier droplets may contain one or more additives or capturing agents as described above. In this embodiment, because the barrier droplets form a closed concentric configuration around the source droplet 102, the barrier droplets obstruct all possible migration pathways between the first and second areas 106, 108 of the EWOD device array 100. The barrier droplets further may be moved or reconfigured individually or in unison, including to open and close pathways to turn migration on and off.

Figure 11:
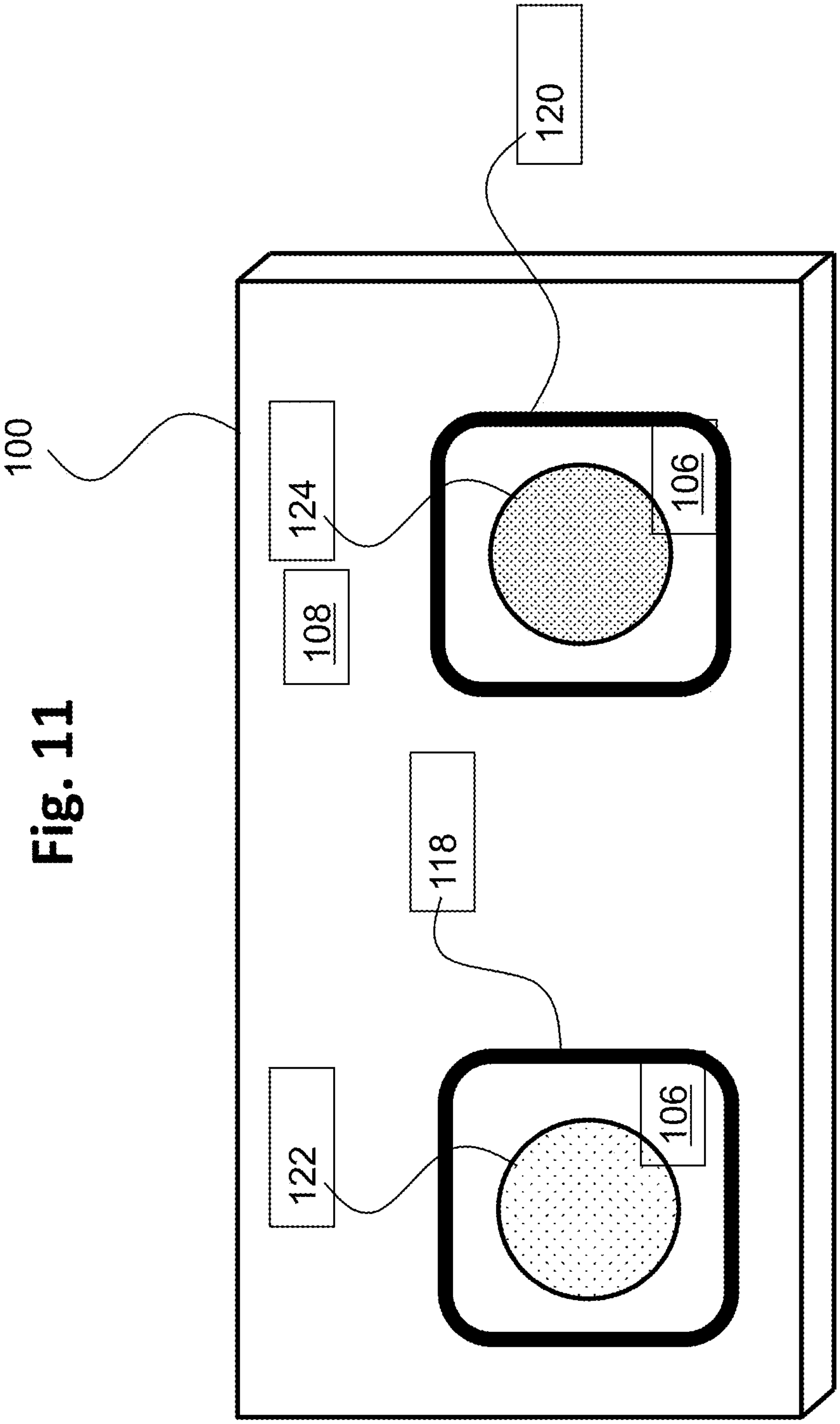
FIG. 11 is a drawing depicting a fifth barrier droplet configuration including multiple barrier droplets that surround respective device areas.

FIG. 11 is a drawing depicting a fifth barrier droplet configuration, which also employs an ensemble of a plurality of barrier droplets, including in this example a first barrier droplet 118 and a second barrier droplet 120. For this configuration, a first droplet 122 is enclosed by the first barrier droplet 118, and a second droplet 124 is enclosed by the second barrier droplet 120. In this manner, the two droplets 122 and 124 are isolated from each other, as well as from the remainder of the EWOD device array. One of the droplets 122 or 124 may be a source droplet containing a high concentration of a migrating species, or a group of source droplets. The other of the droplets 122 or 124 may be a droplet to be protected from the migrating species, or an area, structure, or component of the EWOD device that needs to be protected from the migrating species. Similarly, both droplets may be source droplets containing different migrating species such that each droplet is to be protected from the migrating species of the other droplet. The makeup or contents of the individual barrier droplets 118 and 120 may be the same or different from one another, and in particular may depend on the contents of the droplets 118 and 120 to properly either permit or restrict migration of a given migrating species. Each of the barrier droplets further many include a capturing agent or other additive as described above. In addition, because the barrier droplets form closed configurations around the two droplets 122 and 124, the barrier droplets obstruct all possible migration pathways between the droplets and other areas of the EWOD device array 100. The barrier droplets further may be moved or reconfigured individually or in unison, including to open and close pathways to turn migration on and off.

Figure 12:
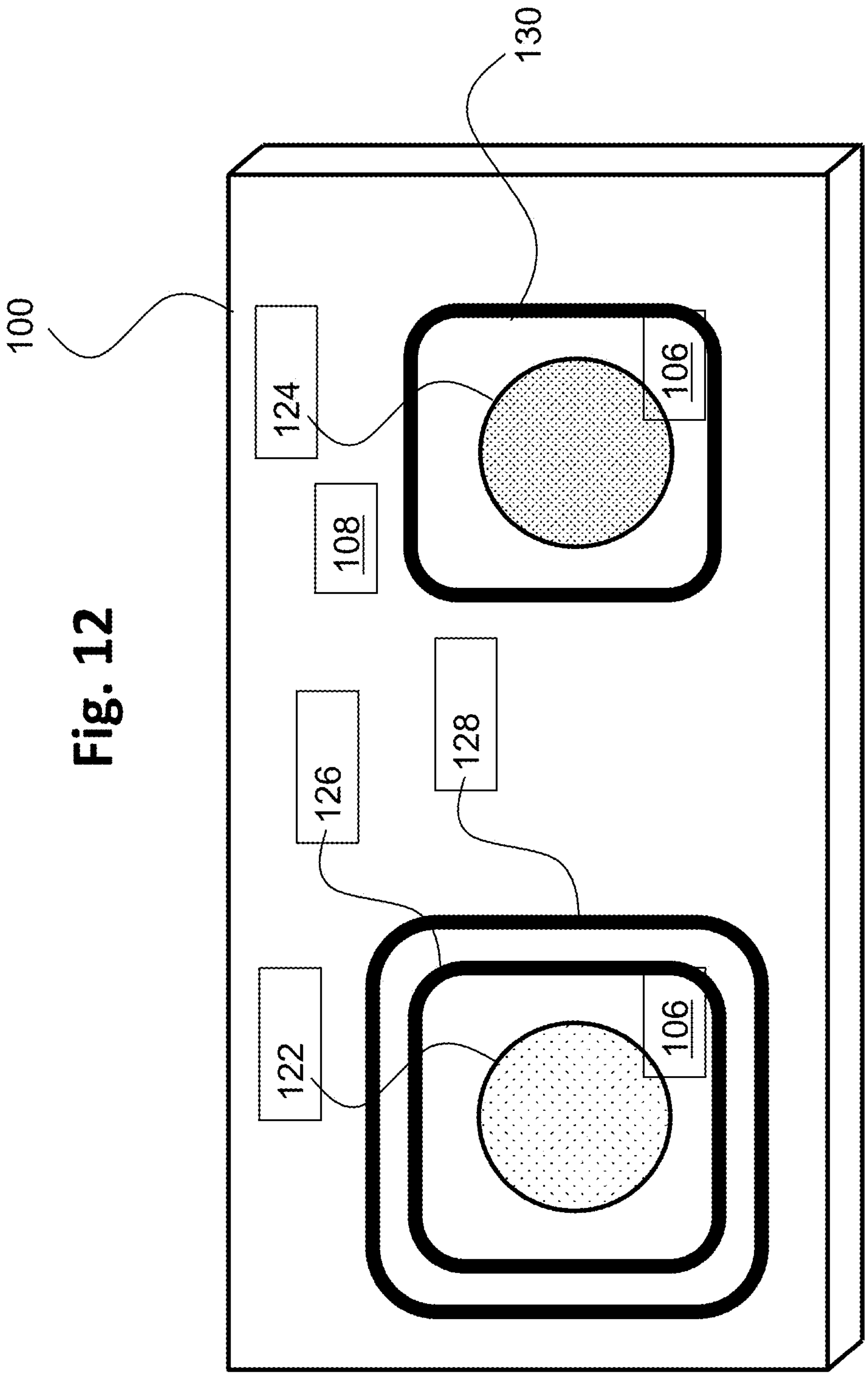
FIG. 12 is a drawing depicting a sixth barrier droplet configuration combining double layer barrier droplets and a single layer barrier droplet.

FIG. 12 is a drawing depicting a sixth barrier droplet configuration, which also employs an ensemble of a plurality of barrier droplets, which in essence combines the configurations of FIGS. 10 and 11. As to the first droplet 122, the barrier configuration employs a concentric, dual barrier droplet configuration of barrier droplets 126 and 128 similarly as in FIG. 10. As to the second droplet 124, the barrier droplet configuration employs a single closed barrier droplet 130, comparably as in FIG. 11. The embodiment of FIG. 12 otherwise is comparable to the previous embodiments with respect to such optional features as the use of capturing agents or additives, and the manner by which the barrier droplets may be moved or reconfigured individually or in unison, including to open and close pathways to turn migration on and off.

Figure 13:
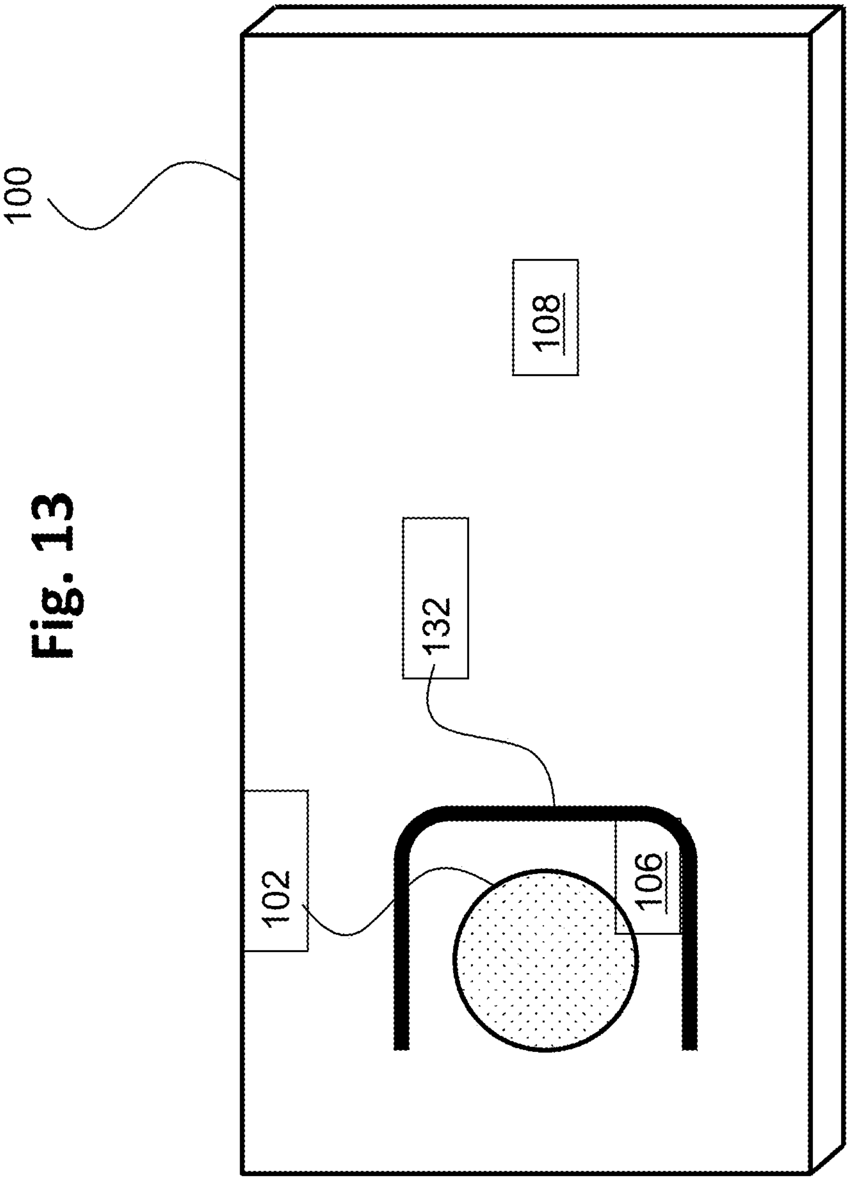
FIG. 13 is a drawing depicting a seventh barrier droplet configuration that partially surrounds an EWOD device area.

In previous embodiments, the barrier droplets are manipulated by the electrowetting forces to form closed barrier structures, thereby obstructing essentially all migration pathways between different areas of the EWOD device array. In certain circumstances, however, it may be sufficient to obstruct only a portion of migration pathways, such as for example when other droplets, structures, or device areas to be protected are located only at certain positions relative to the source droplet. Accordingly, a fully closed barrier configuration may not be warranted. In this regard, FIG. 13 is a drawing depicting a seventh barrier droplet configuration, which employs a barrier droplet 132 that only partially surrounds a first droplet 102. The constituents of the barrier droplet 132 may be comparable as in previous embodiments, including the use of any capturing agents or other additives. With the barrier droplet 132 only partially surrounding the first droplet 102, the first area 106 of the EWOD device array 100 is only partially isolated from the second area 108. In this embodiment, a large proportion of possible migration pathways between the device areas 106 and 108 remain obstructed, although a migration pathway remains where the barrier droplet 132 is open to the second area 108. Based upon a particular position of an object to be protected within the device area 108, such partial obstruction of migration pathways may be sufficient.

The barrier droplet may be reconfigured using the electrowetting forces to alter permitted migration pathways versus obstructed migration pathways as may be suitable for a given reaction protocol. For example, the location of reagents or given reaction steps may be at different areas on the EWOD device array, Accordingly, the barrier droplet may be reconfigured as necessary to change the migration pathways in correspondence with performing different steps of a reaction protocol.

Figure 14:
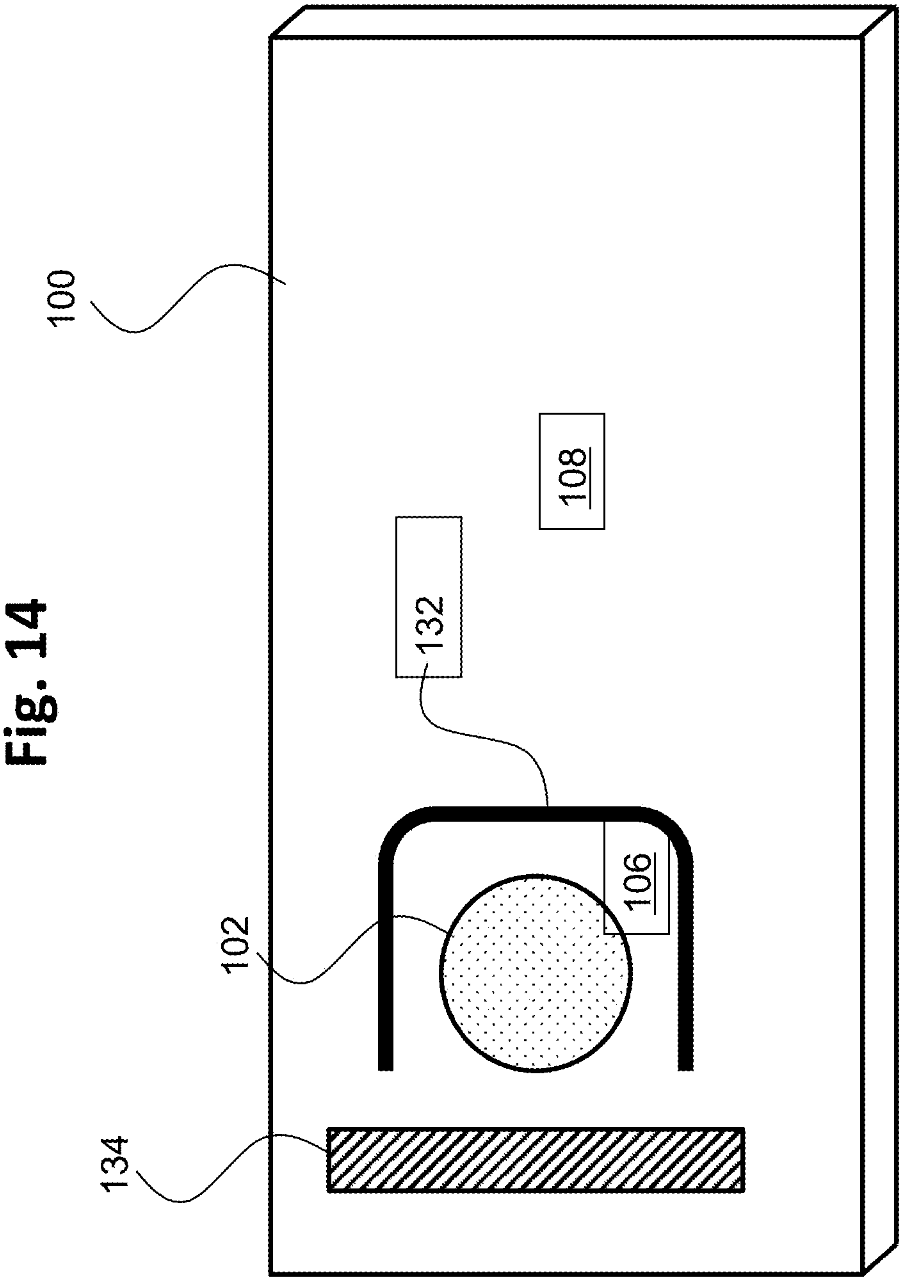
FIG. 14 is a drawing depicting an eighth barrier droplet configuration that partially surrounds an EWOD device area in combination with an additional barrier element.

FIG. 14 is a drawing depicting an eighth barrier droplet configuration, in which a barrier droplet is used in combination with an additional non-droplet, barrier element to determine the obstructed migration pathways. The configuration of FIG. 14 is comparable to that of FIG. 13, with the additional use of a barrier element 134 that is not formed by manipulating a droplet with electrowetting forces. The barrier element 134 may be an actual physical barrier that is a part of the EWOD device, such as a solid structure or a channel wall, or the barrier element may be a hydrogel or any other structure that may impede migration by a different mechanism from a barrier droplet that is manipulated by electrowetting forces. The combination of a barrier droplet 132 and additional barrier element 134 may wholly or partially separate device areas 106 and 108 as described in accordance with previous embodiments. In this embodiment, the barrier droplet may be moved and otherwise reconfigured to adjust the migration pathways, whereas the barrier element 134 is largely fixed or would have to be manipulated by more manual means that are independent of the electrowetting operations of the EWOD device.

Figure 15:
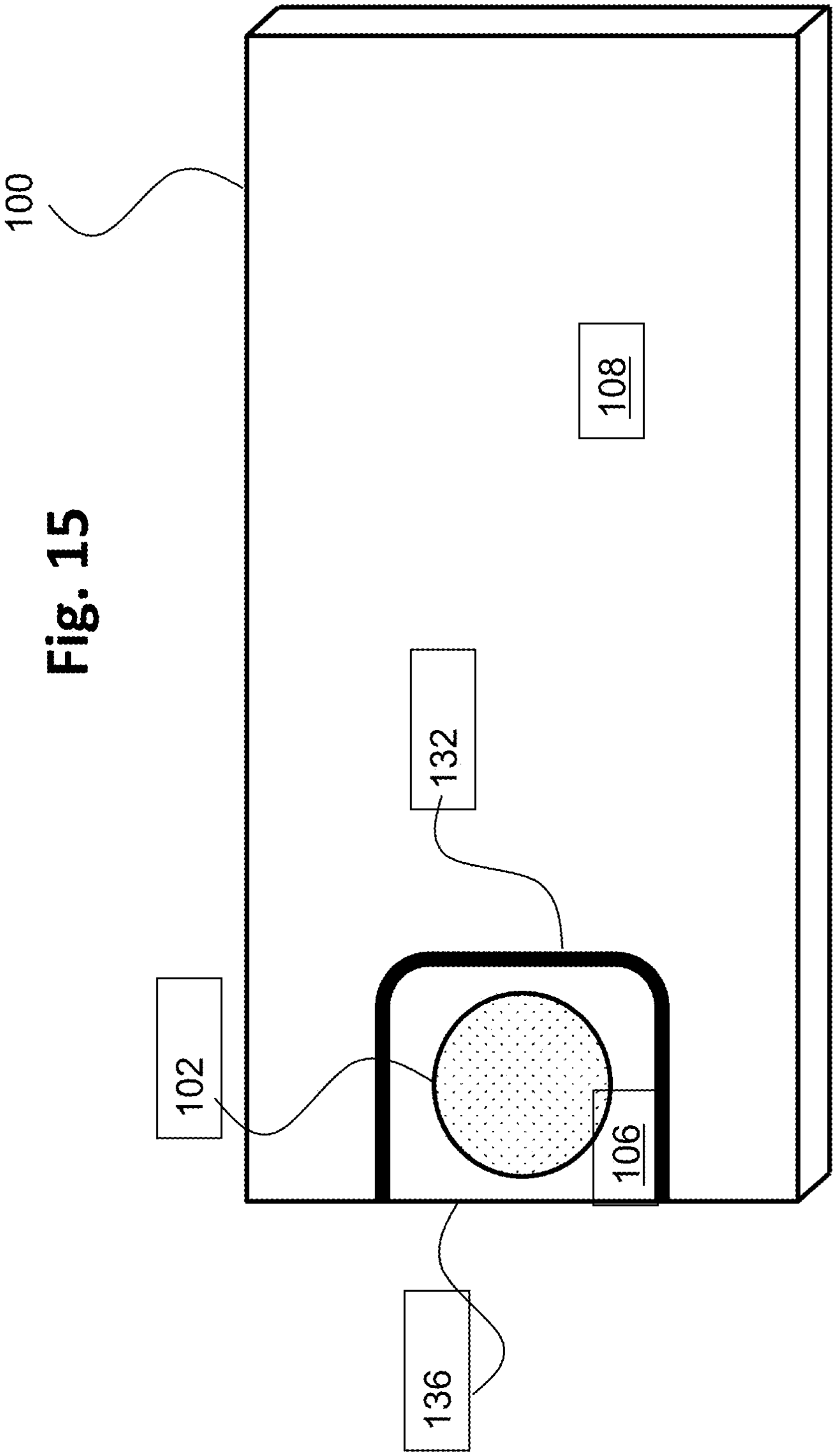
FIG. 15 is a drawing depicting a ninth barrier droplet configuration that partially surrounds an EWOD device area in combination with an EWOD device edge that acts as an additional barrier element.
Figure 16:
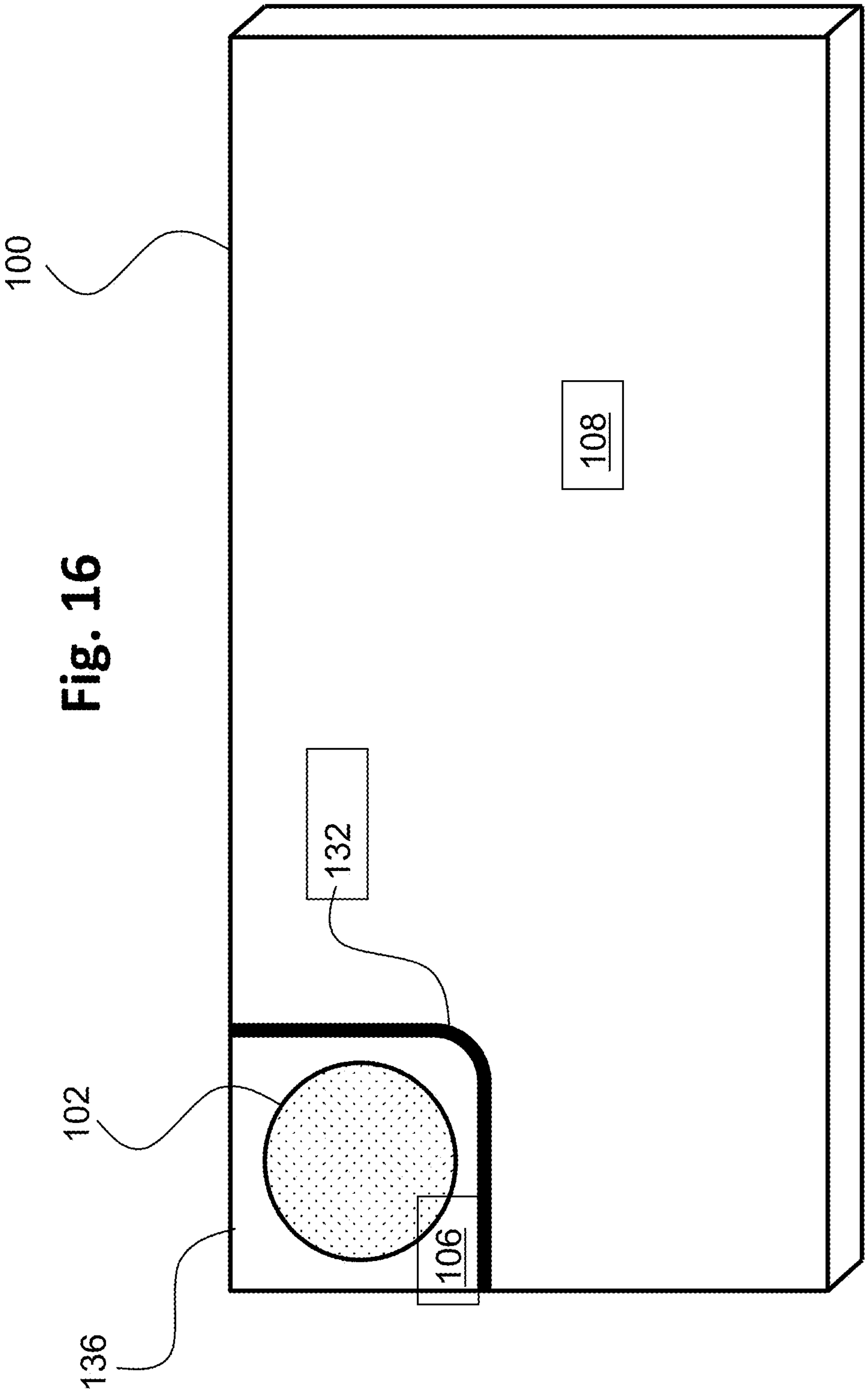
FIG. 16 is a drawing depicting a tenth barrier droplet configuration that partially surrounds an EWOD device area in combination with an EWOD device corner edge that acts as an additional barrier element.

FIG. 15 is a drawing depicting a ninth barrier droplet configuration that is a variation of the embodiment of FIG. 14. In this embodiment, the additional barrier element is an edge 136 of the EWOD device array 100. In this example, with the barrier droplet 132 otherwise enclosing the first droplet 102, the barrier droplet 132 and the device edge 136 combine to form a barrier droplet configuration that obstructs all migration pathways between device areas 106 and 108, i.e., to form a closed barrier configuration. FIG. 16 is a drawing depicting a tenth barrier droplet configuration that is a further variation of the embodiment of FIG. 15, in which the device edge 136 that constitutes the barrier element is a corner edge. Although FIGS. 15 and 16 illustrate a fully obstructive barrier configuration, the barrier droplet 132 alternatively may be configured to combine with the device edge 136 to only partially obstruct the migration pathways.

In previous embodiments, the barrier configuration is formed using a single barrier droplet. In other embodiments, the barrier configuration may be formed using an ensemble of a plurality of barrier droplets. Using electrowetting forces, it can be complex to devise and implement an EWOD driving scheme to form droplet shapes having numerous bends or turns, whereas it is simpler to form barrier droplets of more simple shapes. As an alternative, therefore, instead of shaping a single droplet into the barrier droplet configuration, multiple barrier droplets can be combined in a manner that each individual barrier droplet constitutes a segment or portion of the broader barrier droplet configuration.

Figure 17:
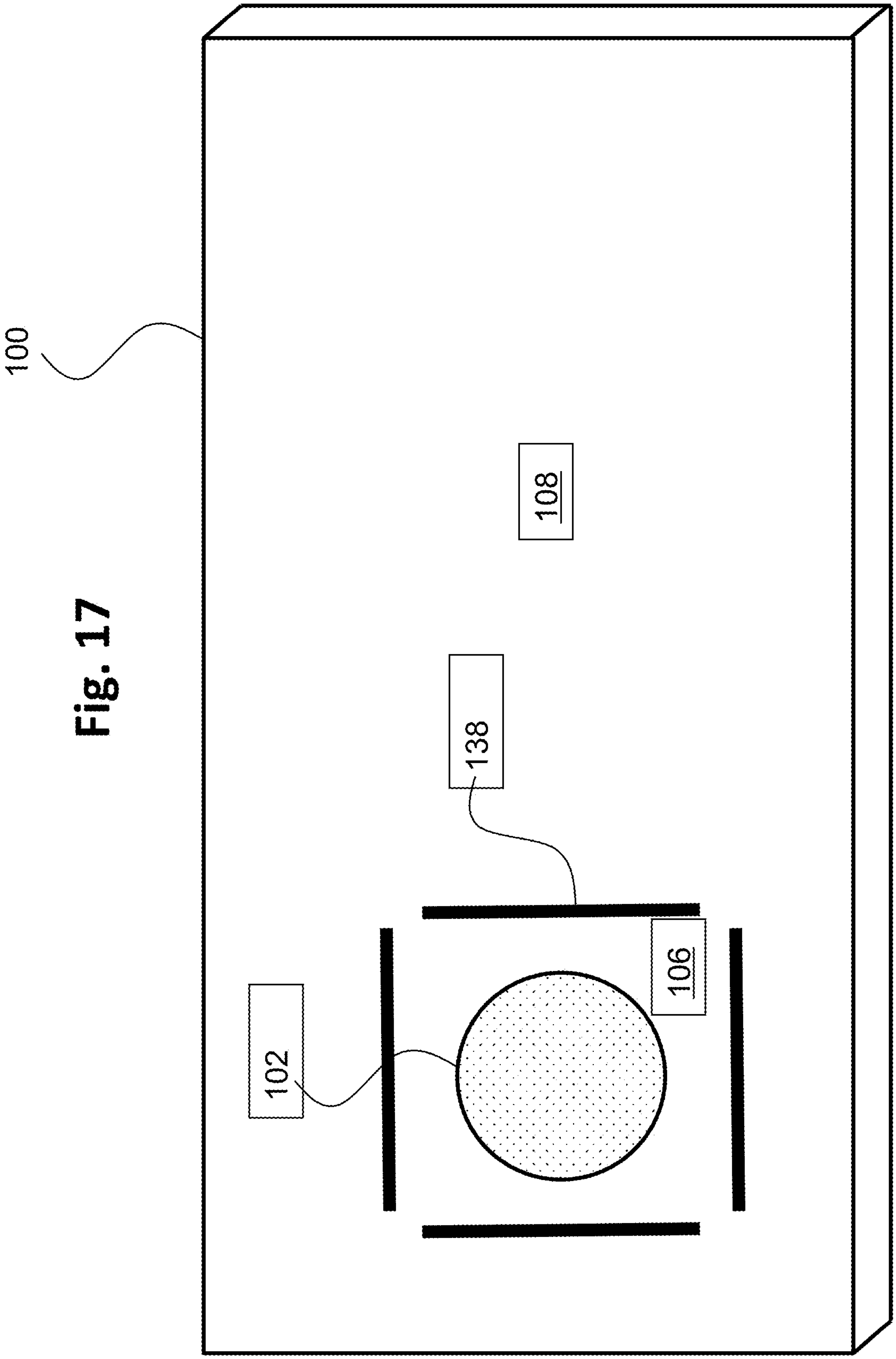
FIG. 17 is a drawing depicting an eleventh barrier droplet configuration that surrounds an EWOD device area using a plurality of individual barrier droplets.

In accordance with such principles, FIG. 17 is a drawing depicting an eleventh barrier droplet configuration, in which a plurality of barrier droplets is combined into the barrier droplet configuration. In this example, four barrier droplets 138 are combined to form the barrier droplet configuration that separates the first area 106 and the second area 108 of the EWOD device array 100. The barrier droplets are combined into a barrier droplet configuration that surrounds the first droplet 102. In this example, there are gaps in the barrier droplet configuration at adjacent barrier droplets, although these gaps can be eliminated by joining the individual barrier droplets with the electrowetting forces. Even with such gaps, a substantial portion of potential migration pathways are obstructed by the illustrated barrier droplet configuration. In addition, although four barrier droplets are depicted in this example, any suitable number of individual barrier droplets may be employed to form an ensemble of any suitable shape as warranted for a particular application. The individual barrier droplets further may have the same composition or different compositions, and may include capturing agents or other additives as in previous embodiments. The barrier droplets also may be manipulated as in previous embodiments using electrowetting forces either individually or in unison to modify the migration pathways between areas of the EWOD device array.

Figure 18:
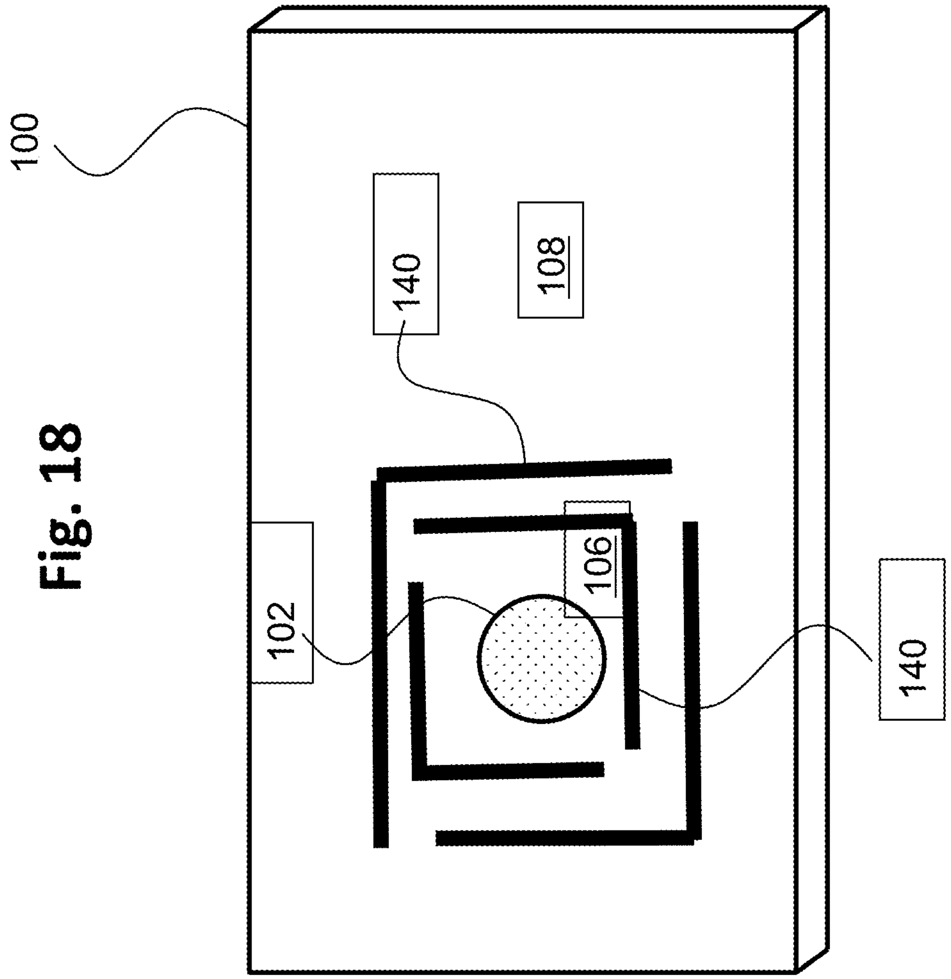
FIG. 18 is a drawing depicting a twelfth barrier droplet configuration that surrounds an EWOD device area using multiple layers of a plurality of individual barrier droplets.

Multiple barrier droplets may be combined in numerous different arrangements to provide different barrier droplet configurations. For example, FIG. 18 is a drawing depicting a twelfth barrier droplet configuration having an alternative arrangement of a plurality of barrier droplets that are combined into the barrier droplet configuration. In this example, multiple barrier droplets 140 are formed, whereby each barrier droplet individually only partially encompasses or partially surrounds a portion of the first area 106 containing the first droplet 102. The barrier droplets are layered and positioned so that gaps between an inner layer of the barrier droplets are obstructed by an outer layer of the barrier droplets, thereby essentially forming a barrier configuration that completely surrounds the first droplet 102. In actual positioning, there remain continuous pathways between the first area 106 and the second area 108 that run between the layers of barrier droplets. In practice, however, the convoluted pathways between the first area 106 and the second area 108 would take significantly longer for a migrating species to traverse. Accordingly, the barrier configuration of FIG. 18 effectively provides full separation of device areas 106 and 108, comparably as closed barrier configurations of previous embodiments.

Figure 19:
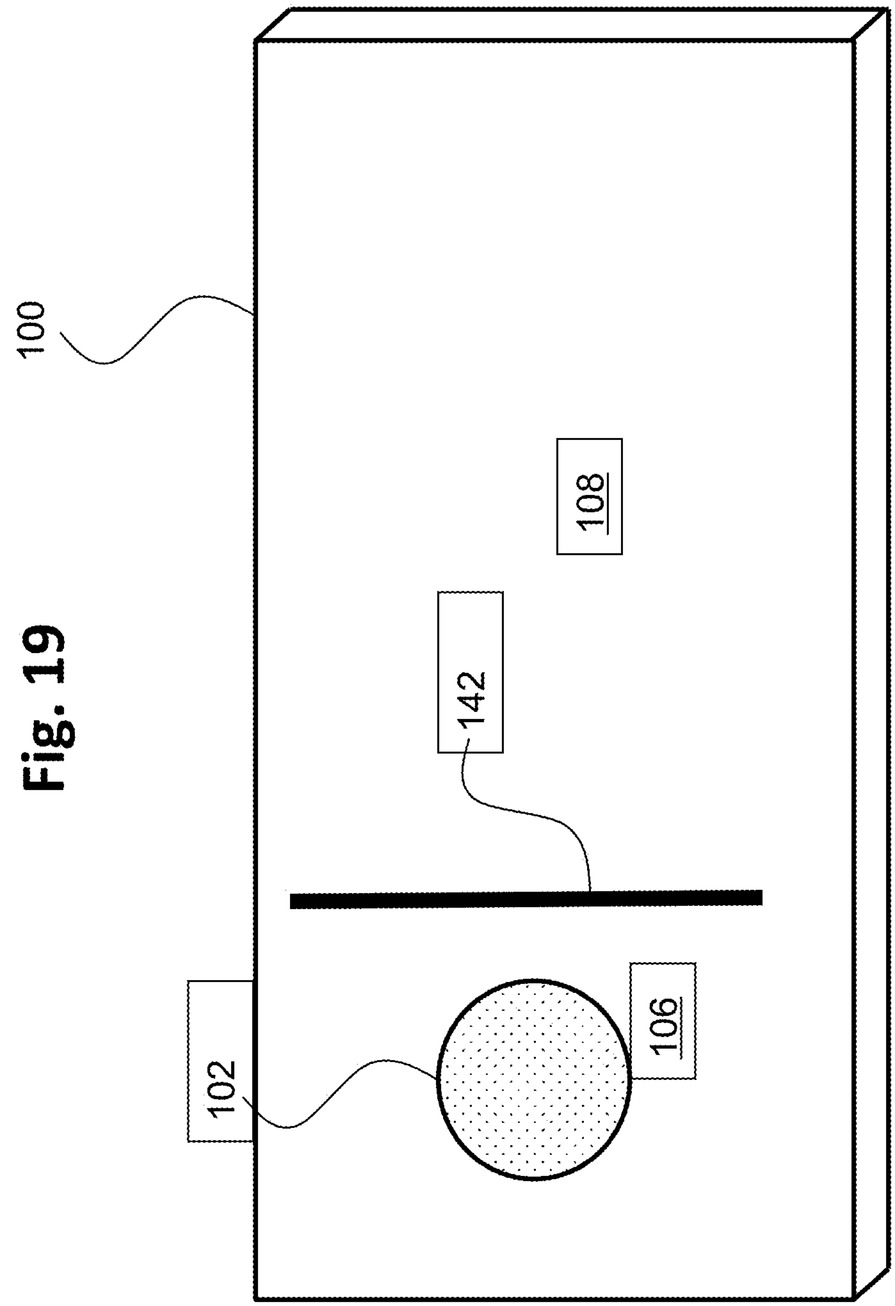
FIG. 19 is a drawing depicting a thirteenth barrier droplet configuration using a single, linearly elongated barrier droplet.

In previous embodiments, barrier droplet configurations are formed that surround or encompass, at least partially, a first area of the EWOD device array, or otherwise extend across a substantial portion of the EWOD device array, to separate the first area from the second area of the EWOD device array. In alternative embodiments, a linear elongated, high aspect ratio barrier droplet can be formed to separate areas of the EWOD device array. A linear elongated, high aspect ratio barrier droplet is a barrier droplet configuration in which the barrier droplet spans a larger number of array elements in a first dimension than in a second dimension. For example, FIG. 19 is a drawing depicting a thirteenth barrier droplet configuration having a linear elongated barrier droplet 142, which separates the first area 106 of the EWOD device from the second area 108. The high aspect ratio is implemented with the barrier droplet 142 having a rectangular shape, with the length dimension being a substantial multiple of the width dimension. For example, the length dimension may be approximately an order of magnitude larger than the width dimension. The first droplet 102 is located within the first area 106. Similarly as in previous embodiments, the first droplet 102 may be a source droplet containing a migrating species, or may be another droplet, device structure, or device area that is to be protected from a migrating species from the second area 108. The linear elongated barrier droplet 142 may have a composition comparably as in other embodiments, including having a capturing agent or other additive that aids in obstruction of the migrating species. The linear elongated barrier droplet 142 further may be manipulated or reconfigured comparably as in previous embodiments, including in ways that alter the migration pathways to turn migration on and off. In the configuration of FIG. 19, migration pathways may remain around the edges of the barrier droplet 142, but such migration pathways may be considered negligible provided the expanse of the barrier droplet 142 extends over a substantial portion of a dimension (e.g., length or width) of the EWOD device array. FIG. 19 has an advantage that a single, elongated droplet tends to be easier to form with electrowetting operations than a non-standard shaped droplet having multiple bends and turns.

Figure 20:
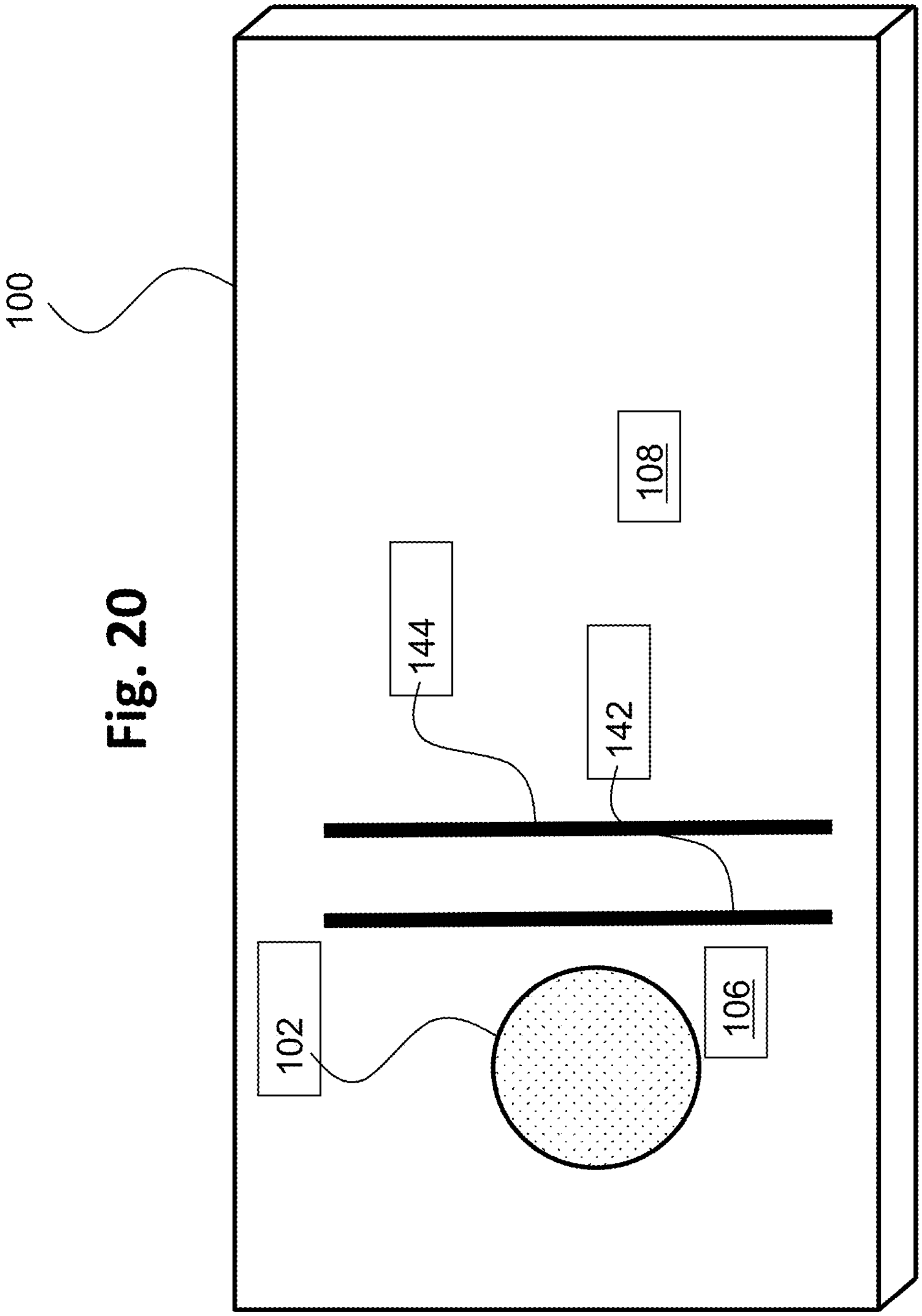
FIG. 20 is a drawing depicting a fourteenth barrier droplet configuration using a plurality of linearly elongated barrier droplets.
Figure 21:
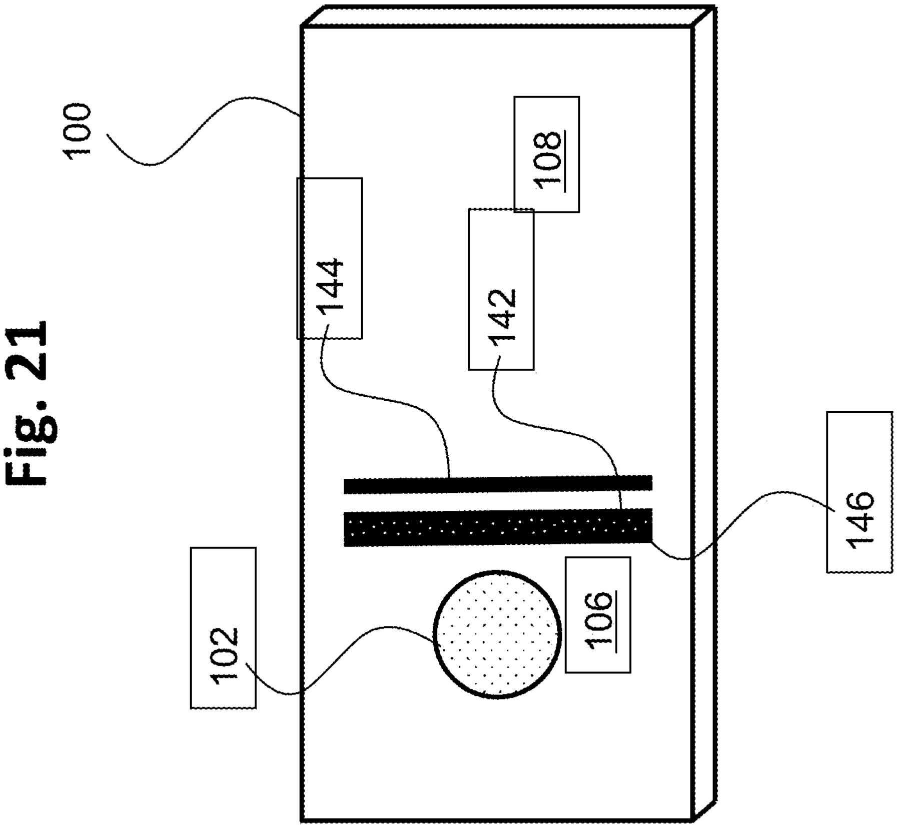
FIG. 21 is a drawing depicting a fifteenth barrier droplet configuration using a plurality of linearly elongated barrier droplets, in which one of the barrier droplets includes an additive such as a capturing agent.

In another embodiment, an ensemble of a plurality of linear elongated barrier droplets may be employed to enhance the obstruction of the migration pathways between the first area 106 and the second area 108 of the EWOD device array. For example, FIG. 20 is a drawing depicting a fourteenth barrier droplet configuration having a plurality of linear elongated barrier droplets. In this example, the first linear elongated barrier droplet 142 is combined with a second linear elongated barrier droplet 144 to enhance obstruction of the migration pathways, although any suitable number of linear elongated barrier droplets may be employed. As in previous embodiments including a plurality of barrier droplets, the composition of each individual barrier droplet may be the same or different as may be suitable for any particular application. In particular, one or more of the linear elongated barrier droplets may include a capturing agent or other additive that enhances obstruction of the migration pathways. For example, FIG. 21 is a drawing depicting a fifteenth barrier droplet configuration having a plurality of linear elongated barrier droplets, wherein the first linear elongated barrier droplet 142 includes an additive 146, such as a capturing agent. It will be appreciated that in such an ensemble of linear elongated barrier droplets, any one or other number, up to all, of the barrier droplets may include a capturing agent or other additive, which may be the same or different in the different barrier droplets.

Figure 22:
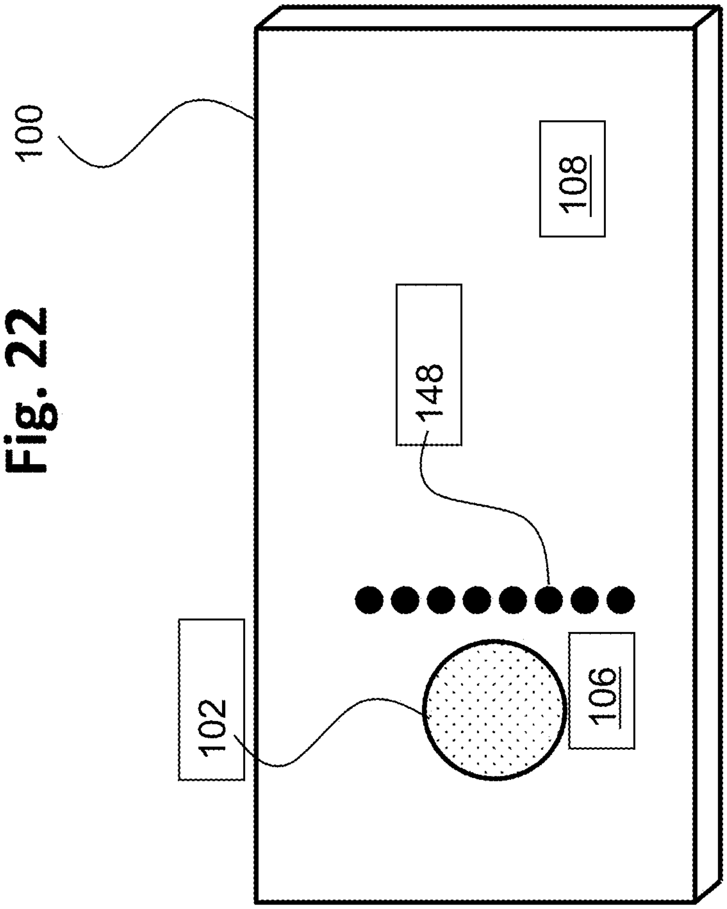
FIG. 22 is a drawing depicting a sixteenth barrier droplet configuration using a plurality of individual barrier droplets positioned in a linear arrangement.

In the embodiments of FIGS. 19-21, the droplet barrier configuration is formed as one or more linear elongated barrier droplets. As an alternative embodiment, FIG. 22 is a drawing depicting a sixteenth barrier droplet configuration, in which the barrier configuration is formed as an ensemble of a plurality of individual droplets that are linearly arranged. In this example, a plurality of individual droplets 148 are linearly arranged to separate the first area 106 from the second area 108 of the EWOD device array. This arrangement has a comparable performance as the embodiment of FIG. 19 having a single linear elongated barrier droplet. The embodiment of FIG. 19 may be advantageous in that there is better obstruction of the migration pathways, insofar as gaps are present between the individual droplets 148 in the embodiment of FIG. 22. In contrast, the embodiment of FIG. 22 may be advantageous in that the EWOD driving scheme is simpler to generate and position relatively smaller individual droplets of more standard or native shape that the droplet has in absence of electrowetting forces (e.g., ellipsoid) or as natively generated in connection with common actuation of a smaller group of electodes to form such as individual square droplets, as compared to generating relatively larger droplets of more non-standard elongated shapes that extend over a substantial portion of the EWOD device array.

Figure 23:
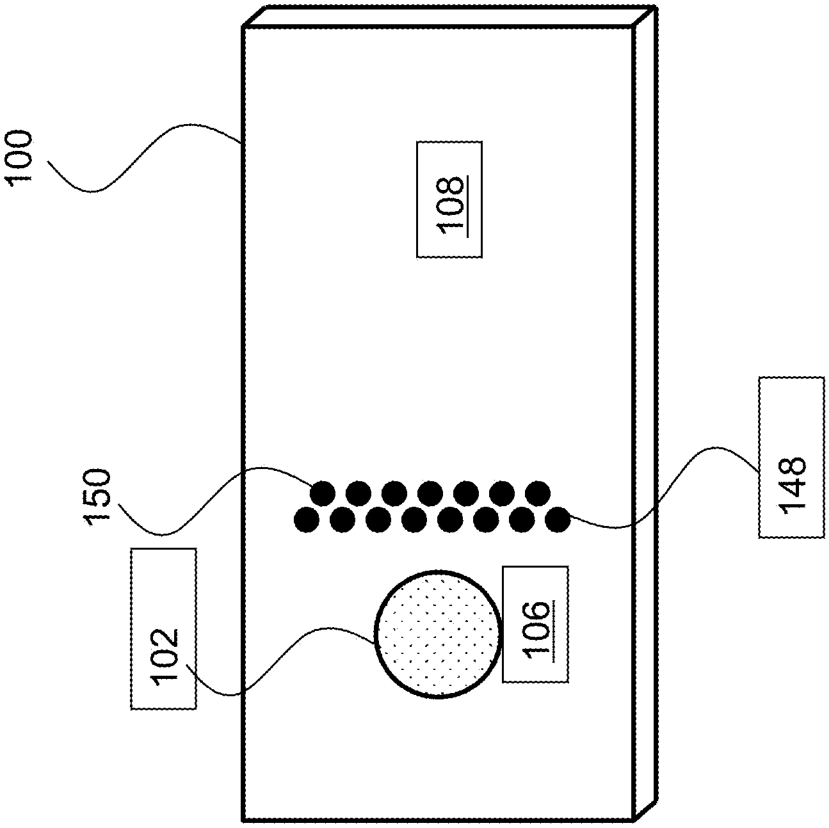
FIG. 23 is a drawing depicting a seventeenth barrier droplet configuration using two offset layers of a plurality of individual barrier droplets positioned in a linear arrangement.

Similarly as with the embodiment of FIG. 20, multiple layers of droplets positioned in a linear arrangement may be employed to enhance the obstruction of the migration pathways. For example, FIG. 23 is a drawing depicting a seventeenth barrier droplet configuration having a plurality of layers of individual droplets that are linearly arranged. In this example, the first layer of individual droplets 148 is combined with a second layer of individual droplets 150 that also are linearly arranged. The droplets 148 and the droplets 150 may be offset relative to each other so as to enhance the obstruction of the migration pathways. With such arrangement, the droplets 150 are positioned at the gaps between the droplets 148 (and inherently vice versa), such that the resultant migration pathways require directional changes in the migration to move between the device areas 106 and 108. As referenced above, migration along such multi-directional pathways tends not to occur given the nature of the migration of typical migrating species. Accordingly, the barrier configuration of FIG. 23 effectively provides comparable separation of areas 106 and 108 as the configuration of FIG. 20, but with the more easily generated standard or natively shaped ellipsoid or square individual droplets rather than the linear elongated droplets.

As referenced above, it may be advantageous to form droplet configurations using patterns of smaller individual ellipsoid, square, or otherwise shaped droplets rather than larger non-standard shaped droplets, in that the EWOD driving scheme is simpler to generate and position smaller individual droplets of more standard shape (e.g., ellipsoid), as compared to generating larger droplets of more non-standard shapes that singularly span a large portion of the EWOD device array. Accordingly, previous embodiments employing larger barrier droplets of non-standard shape may be modified to form comparable barrier configurations that include an arrangement of individual smaller droplets of standard (square) or native (ellipsoid) shape. In such embodiments, any suitable number of individual droplets may be employed to form an ensemble of any suitable overall shape as warranted for a particular application. The individual barrier droplets further may have the same composition or different compositions, and may include capturing agents or other additives as in previous embodiments. The barrier droplets also may be manipulated as in previous embodiments using electrowetting forces either individually or in unison to modify the migration pathways between areas of the EWOD device array.

Figure 24:
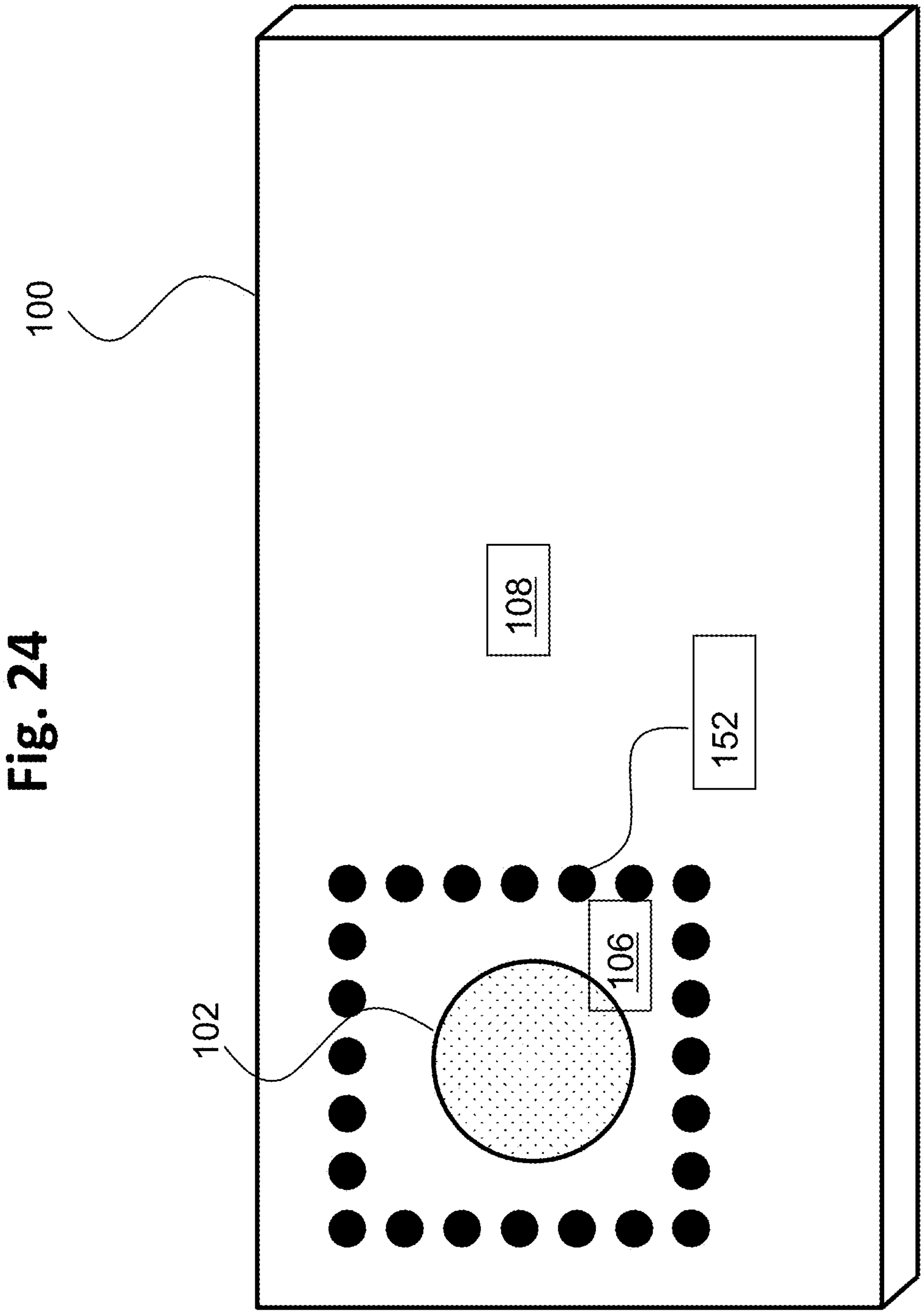
FIG. 24 is a drawing depicting an eighteenth barrier droplet configuration, which is a variation of the embodiment of FIG. 7 that uses a plurality of individual barrier droplets.
Figure 25:
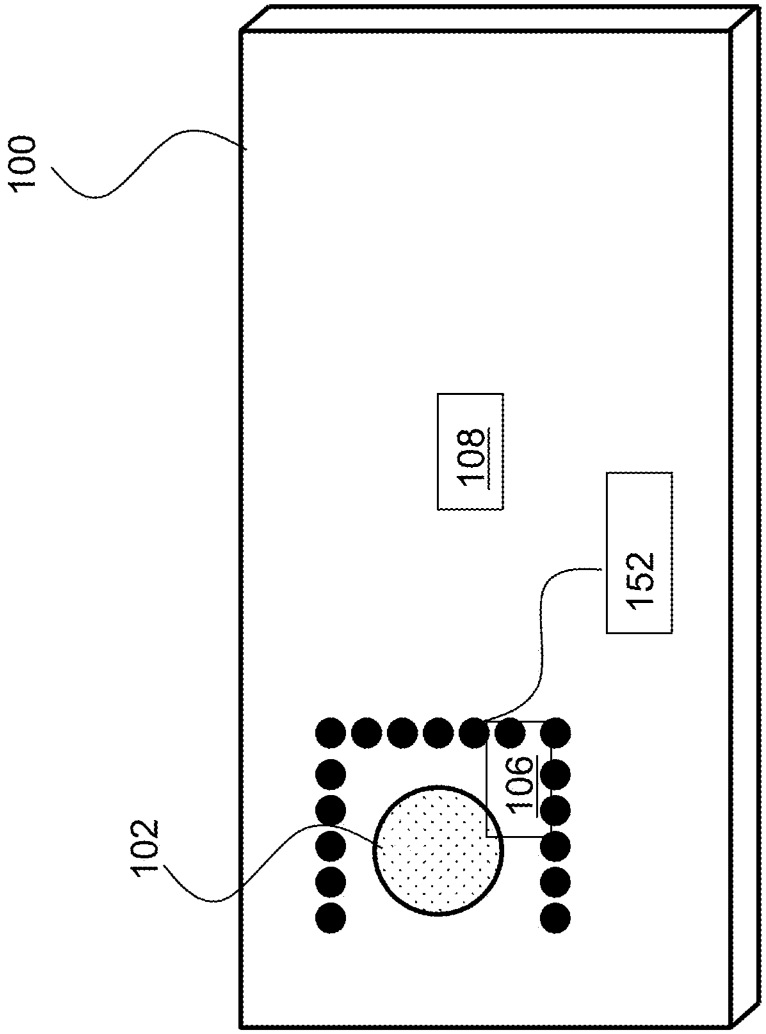
FIG. 25 is a drawing depicting a nineteenth barrier droplet configuration, which is a variation of the embodiment of FIG. 13 that uses a plurality of individual barrier droplets.
Figure 26:
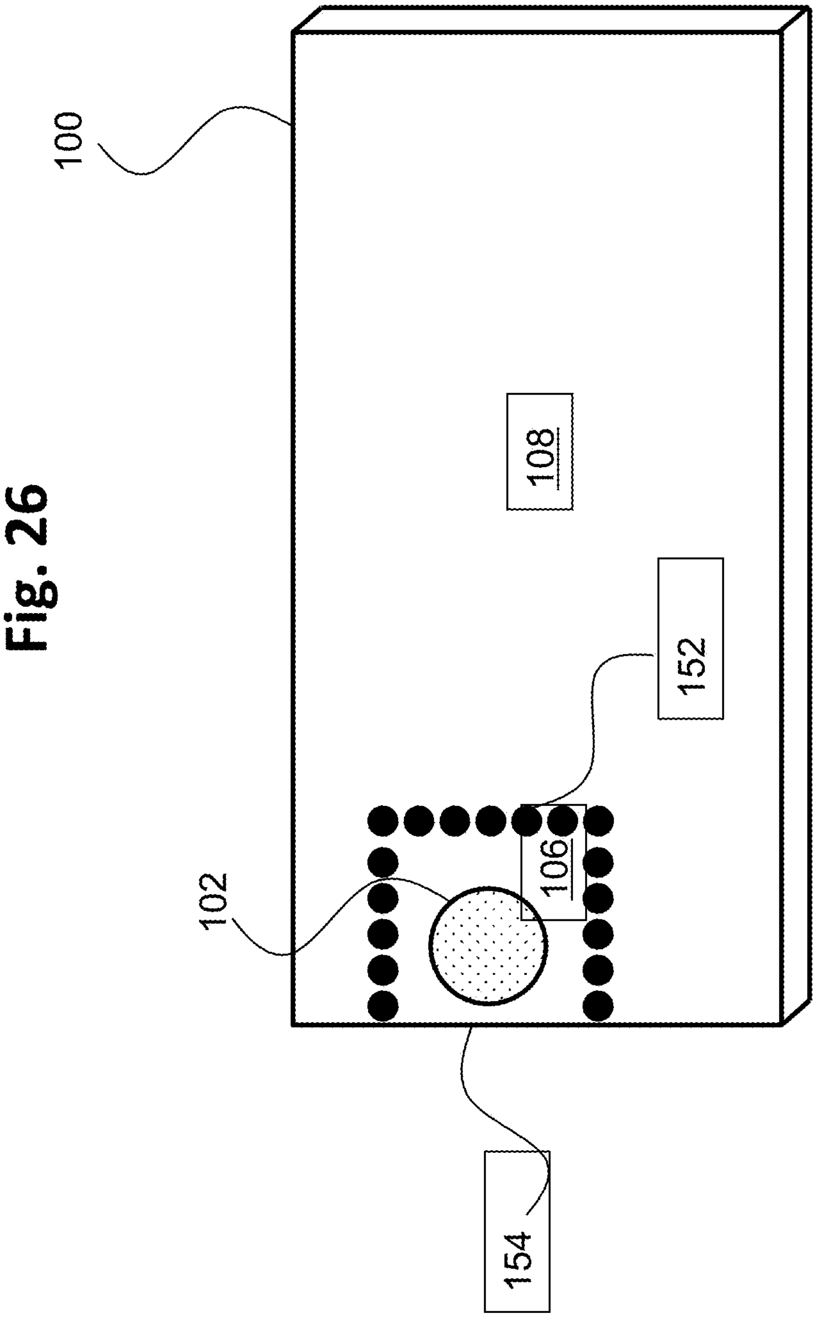
FIG. 26 is a drawing depicting a twentieth barrier droplet configuration, which is a variation of the embodiment of FIG. 15 that uses a plurality of individual barrier droplets.
Figure 27:
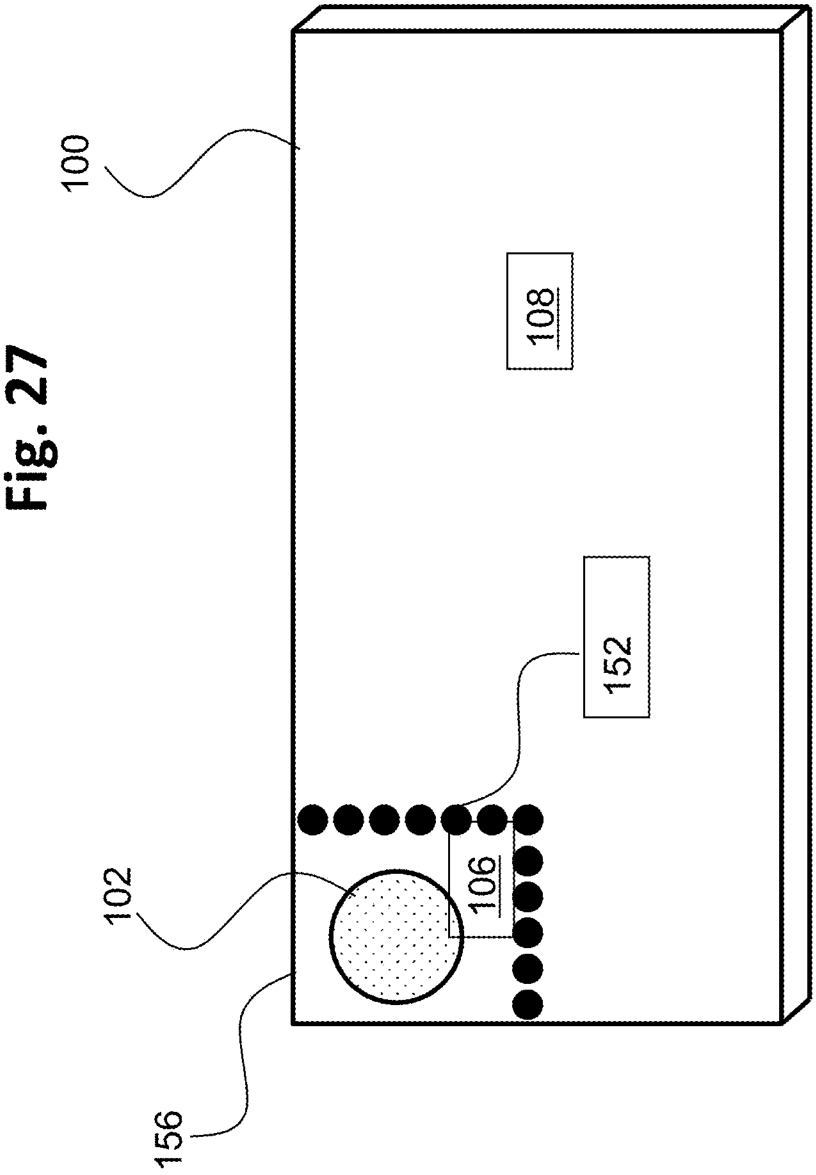
FIG. 27 is a drawing depicting a twenty-first barrier droplet configuration, which is a variation of the embodiment of FIG. 16 that uses a plurality of individual barrier droplets.
Figure 28:
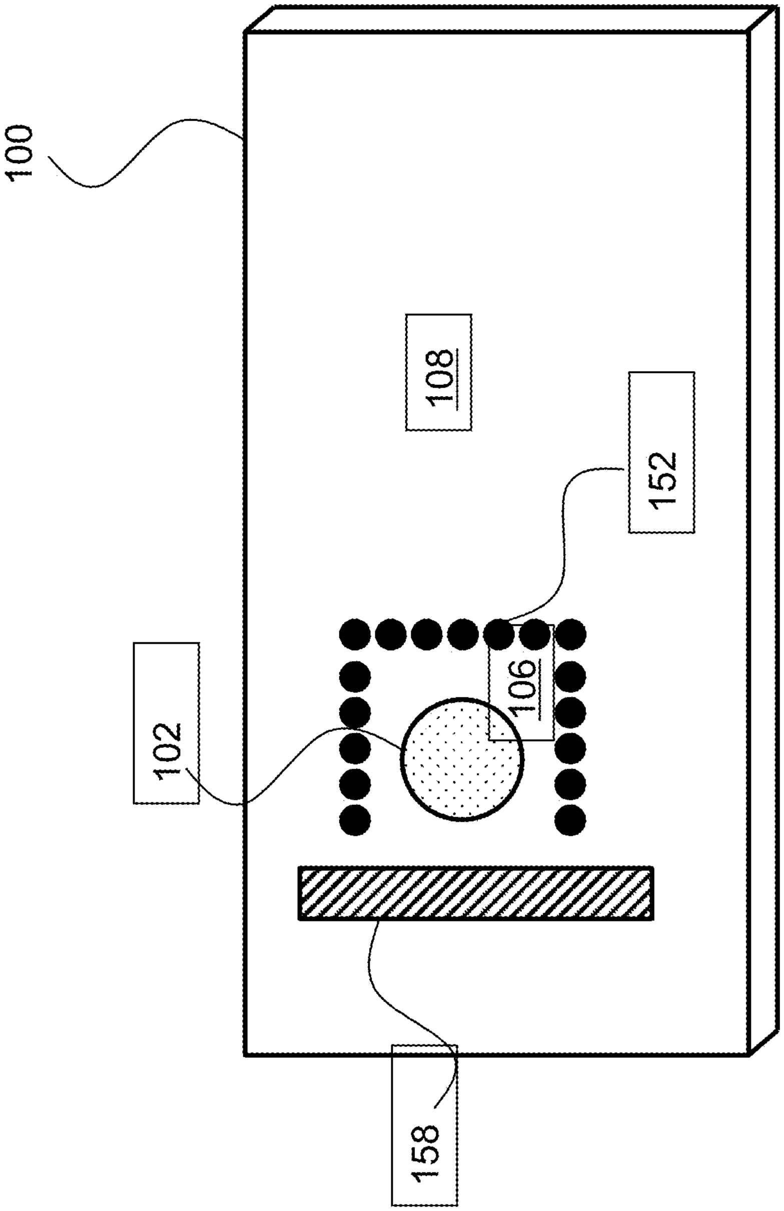
FIG. 28 is a drawing depicting a twenty-second barrier droplet configuration, which is a variation of the embodiment of FIG. 14 that uses a plurality of individual barrier droplets.
Figure 29:
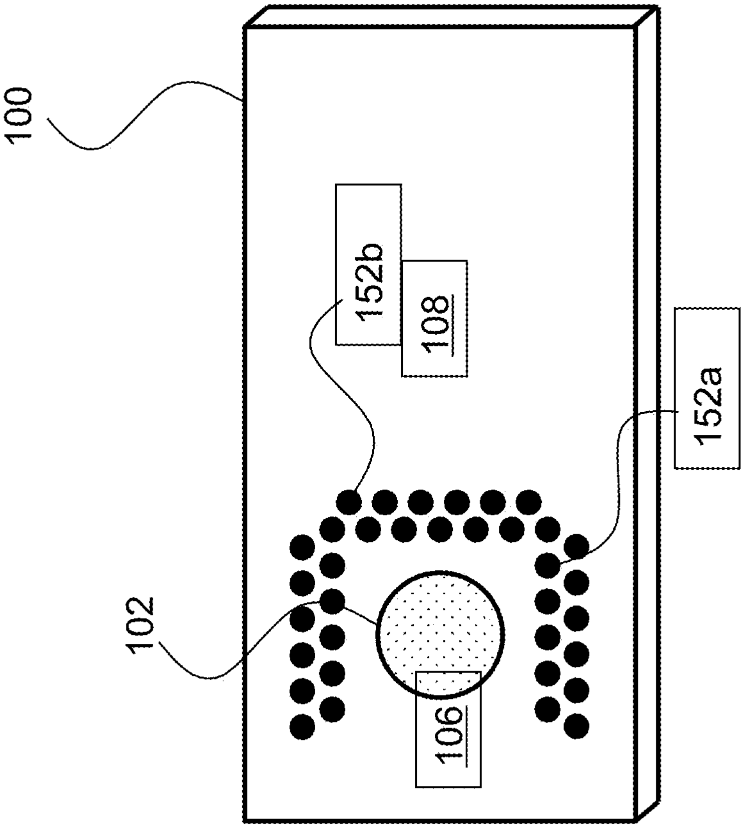
FIG. 29 is a drawing depicting a twenty-third barrier droplet configuration, which is a variation of the embodiment of FIG. 25 that uses two offset layers of a plurality of individual barrier droplets.
Figure 30:
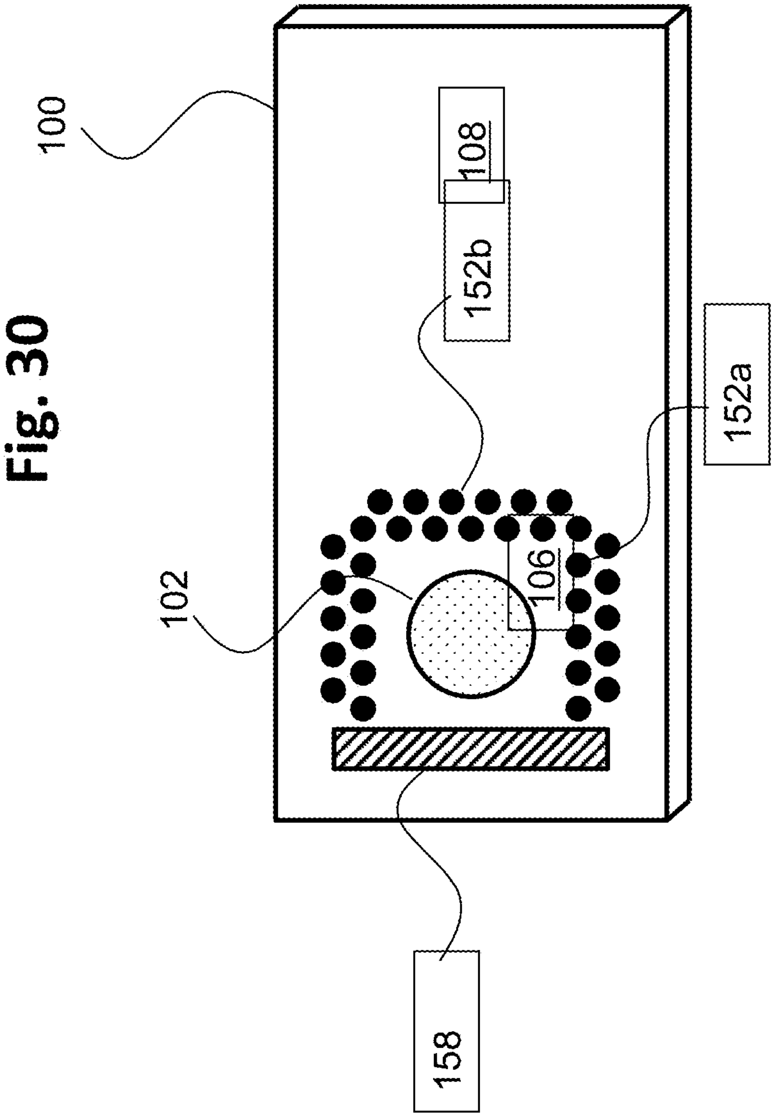
FIG. 30 is a drawing depicting a twenty-fourth barrier droplet configuration, which is a variation of the embodiment of FIG. 28 that uses two offset layers of a plurality of individual barrier droplets.

For example, FIG. 24 is a drawing depicting an eighteenth barrier droplet configuration that forms a barrier configuration comparable to that of FIG. 7, but modified whereby a plurality of individual droplets 152 are arranged to completely surround the first area 106 of the EWOD device array. FIG. 25 is a drawing depicting a nineteenth barrier droplet configuration that forms a barrier configuration comparable to that of FIG. 13, but modified whereby a plurality of individual droplets 152 are arranged to partially surround the first area 106 of the EWOD device array. FIG. 26 is a drawing depicting a twentieth barrier droplet configuration that forms a barrier configuration comparable to that of FIG. 15, but modified whereby a plurality of individual droplets 152 are arranged to partially surround the first area 106 of the EWOD device array, and further combining with an edge 154 of the EWOD device array acting as a barrier element. FIG. 27 is a drawing depicting a twenty-first barrier droplet configuration that forms a barrier configuration comparable to that of FIG. 16, but modified whereby a plurality of individual droplets 152 are arranged to partially surround the first area 106 of the EWOD device array, and further combining with a corner edge 156 of the EWOD device array acting as a barrier element. FIG. 28 is a drawing depicting a twenty-second barrier droplet configuration that forms a barrier configuration comparable to that of FIG. 14, but modified whereby a plurality of individual droplets 152 are arranged to partially surround the first area 106 of the EWOD device array, and further combining with an additional barrier element 158, such as a physical wall or channel, hydrogel, or any other structure that may impede migration by a different mechanism from a barrier droplet that is manipulated by electrowetting forces. FIG. 29 is a drawing depicting a twenty-third barrier droplet configuration that forms a barrier configuration comparable to that of FIG. 25, but using two layers of individual barrier droplets **152*a* and 152*b* arranged to partially surround the first area 106. FIG. 30 is a drawing depicting a twenty-fourth barrier droplet configuration that forms a barrier configuration comparable to that of FIG. 28, but using two layers of individual barrier droplets 152*a* and 152*b* arranged to partially surround the first area 106 in combination with the additional barrier element 158**.

In accordance with the above, a myriad of barrier droplet configurations may be devised using any suitable combinations of barrier droplet arrangements, shapes, and compositions (including any capturing agents or other additives), along with any additional barrier elements that are not barrier droplets. The following illustrates potential examples, although again it will be appreciated that such examples are not intended to be exhaustive. Like references numerals are used to identify analogous components.

Figure 31:
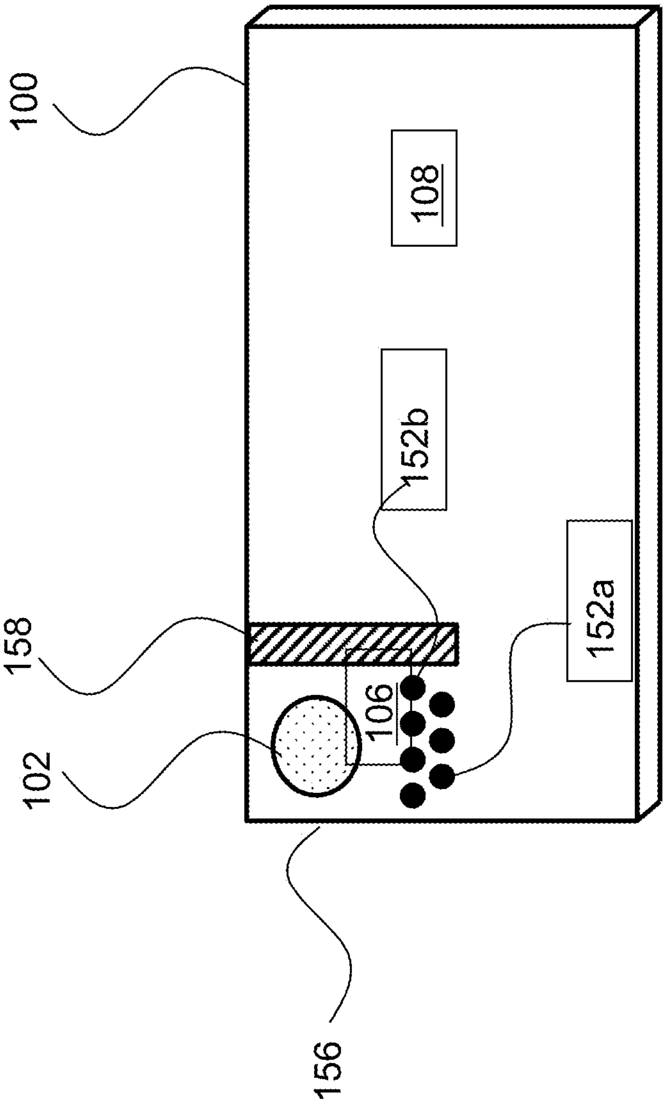
FIG. 31 is a drawing depicting a twenty-fifth barrier droplet configuration, which combines multiple features of previous embodiments.
Figure 32:
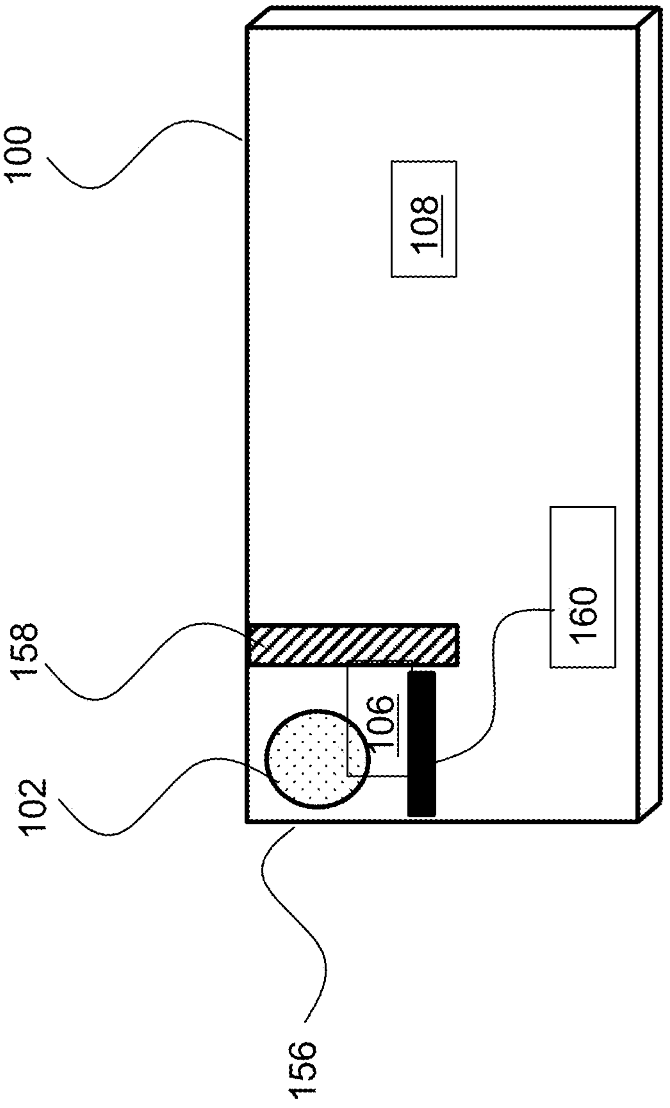
FIG. 32 is a drawing depicting a twenty-sixth barrier droplet configuration, which combines multiple features of previous embodiments.
Figure 33:
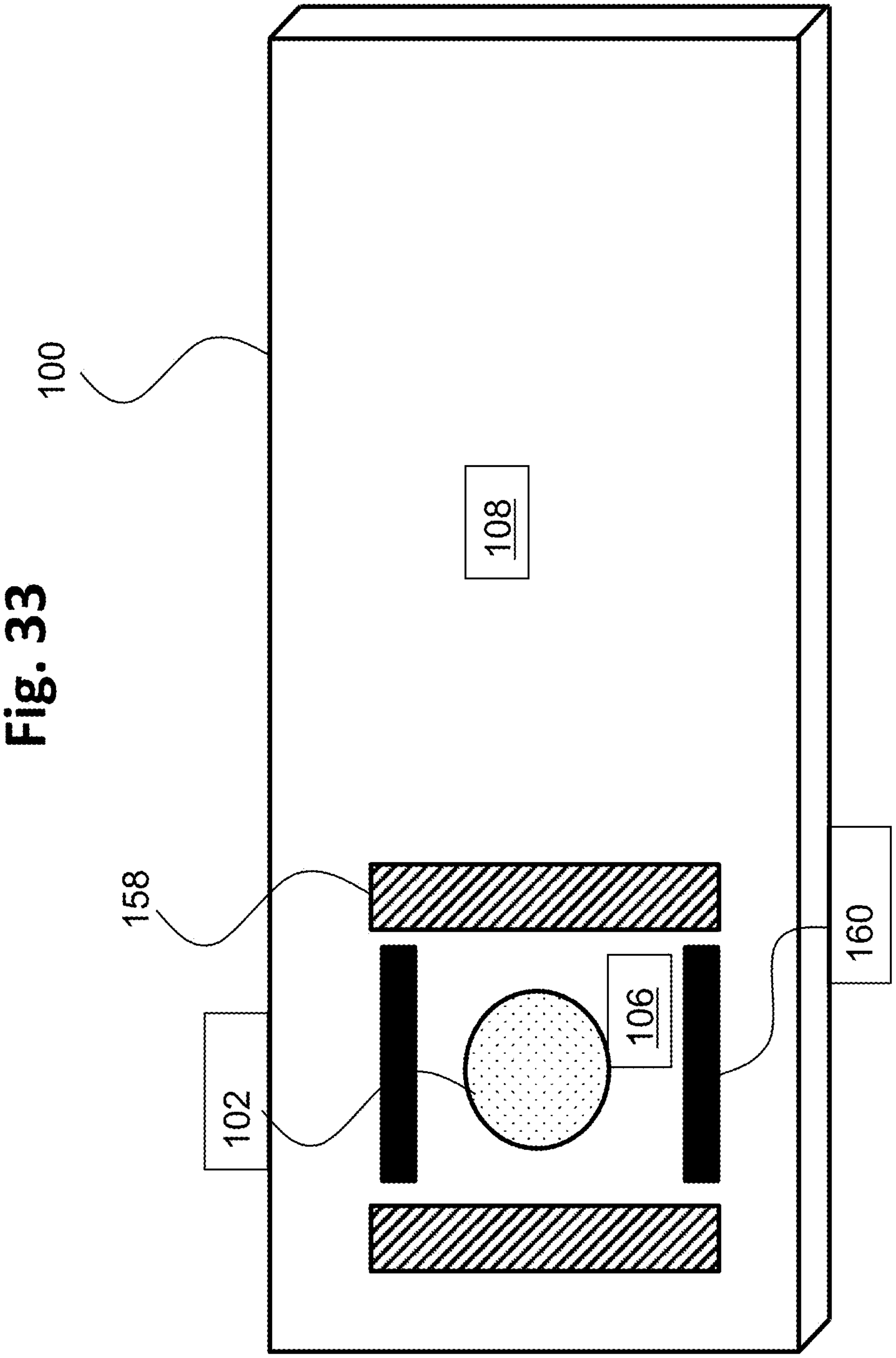
FIG. 33 is a drawing depicting a twenty-seventh barrier droplet configuration, which combines multiple features of previous embodiments.
Figure 34:
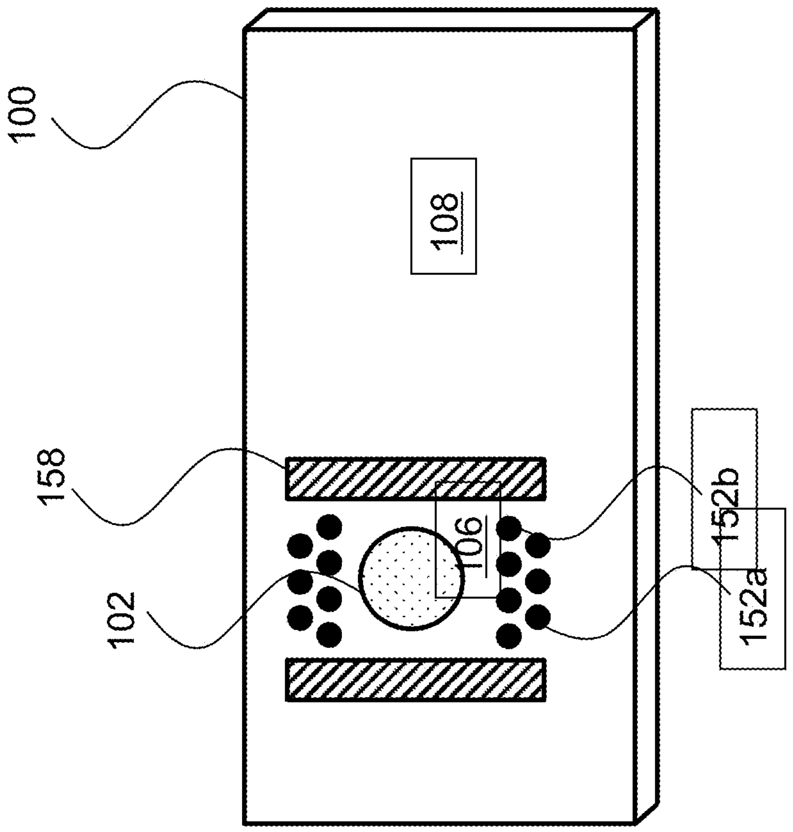
FIG. 34 is a drawing depicting a twenty-eighth barrier droplet configuration, which combines multiple features of previous embodiments.
Figure 35:
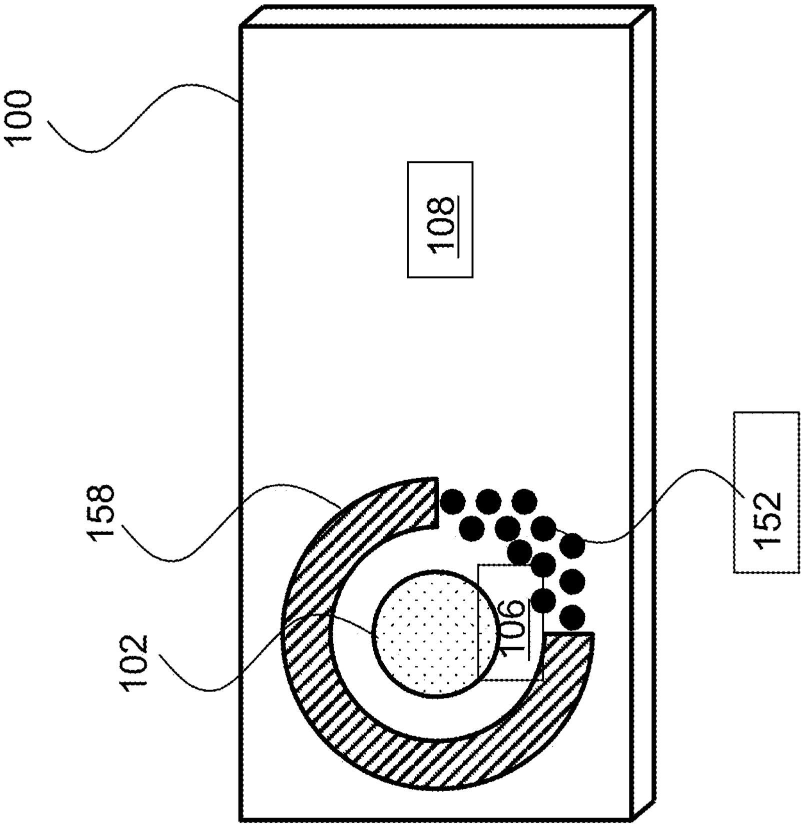
FIG. 35 is a drawing depicting a twenty-ninth barrier droplet configuration, which combines an array of barrier droplets with an additional barrier element that forms a receptacle.
Figure 36:
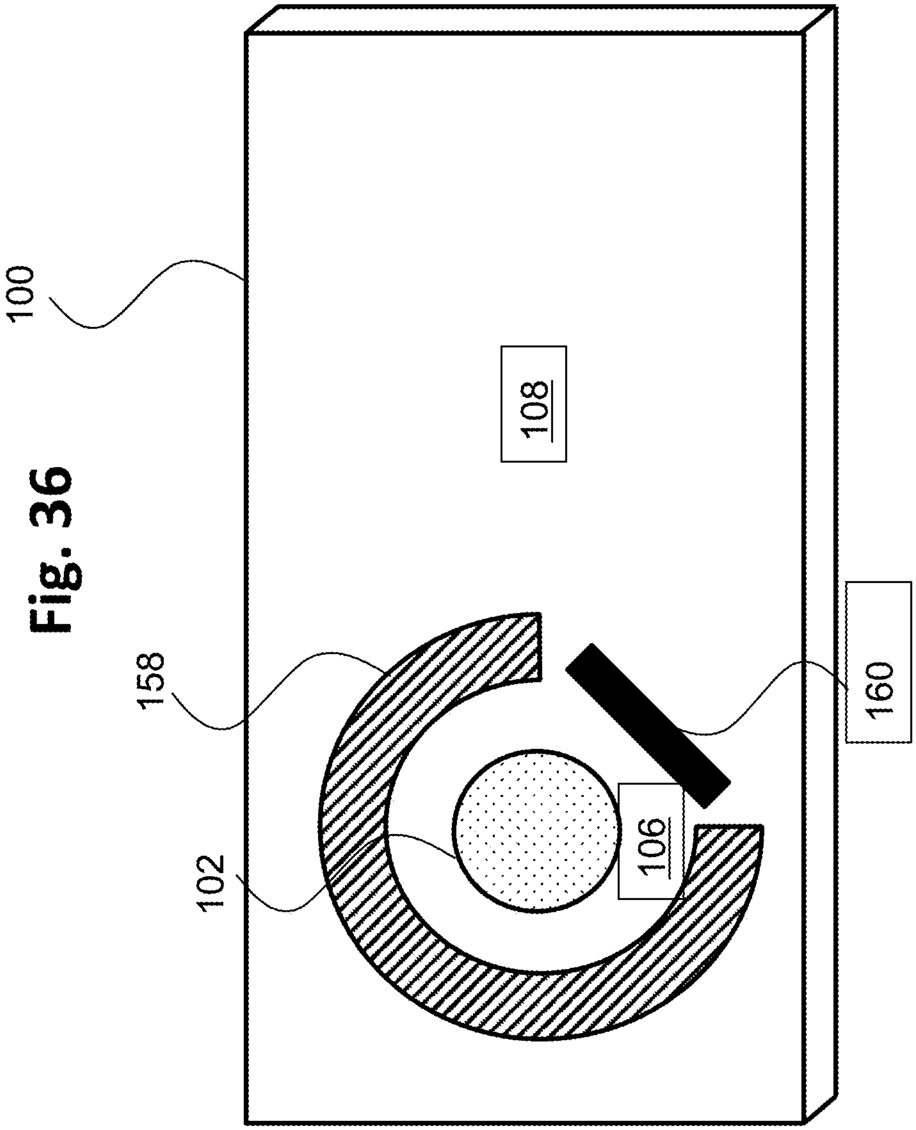
FIG. 36 is a drawing depicting a thirtieth barrier droplet configuration, which combines a single elongated barrier droplet with an additional barrier element that forms a receptacle.

FIG. 31 is a drawing depicting a twenty-fifth barrier droplet configuration, in which two offset layers of individual barrier droplets 152 partially surround the device area 106, in combination with a corner edge 156 of the EWOD device array and an additional barrier element 158 that aid in obstruction of migration pathways. FIG. 32 is a drawing depicting a twenty-sixth barrier droplet configuration, in which a single linear elongated barrier droplet 160 partially surrounds the device area 106, in combination with a corner edge 156 of the EWOD device array and an additional barrier element 158 that aid in obstruction of migration pathways. FIG. 33 is a drawing depicting a twenty-seventh barrier droplet configuration, in which two linear elongated barrier droplets 160 are opposingly positioned to partially surround the device area 106, in combination with additional opposing barrier elements 158, resulting in nearly complete surrounding of the device area 106. FIG. 34 is a drawing depicting a twenty-eighth barrier droplet configuration, in which double offset layers of individual barrier droplets **152*a* and 152*b* are opposingly positioned to partially surround the device area 106, in combination with additional opposing barrier elements 158, resulting in nearly complete surrounding of the device area 106. FIG. 35 is a drawing depicting a twenty-ninth barrier droplet configuration, in which an array of offset individual barrier droplets 152 are positioned to partially surround the device area 106, in combination with an additional barrier element 158, with the barrier element 158 being shaped to form a receptacle having an opening at which the barrier droplets 152 are positioned to obstruct migration pathways between the device area 106 located within the receptacle and the device area 108 external from the receptacle. FIG. 36 is a drawing depicting a thirtieth barrier droplet configuration comparable to that of FIG. 35, with the barrier configuration including a single linear elongated barrier droplet 160** rather than an array of individual barrier droplets.

Figure 37:
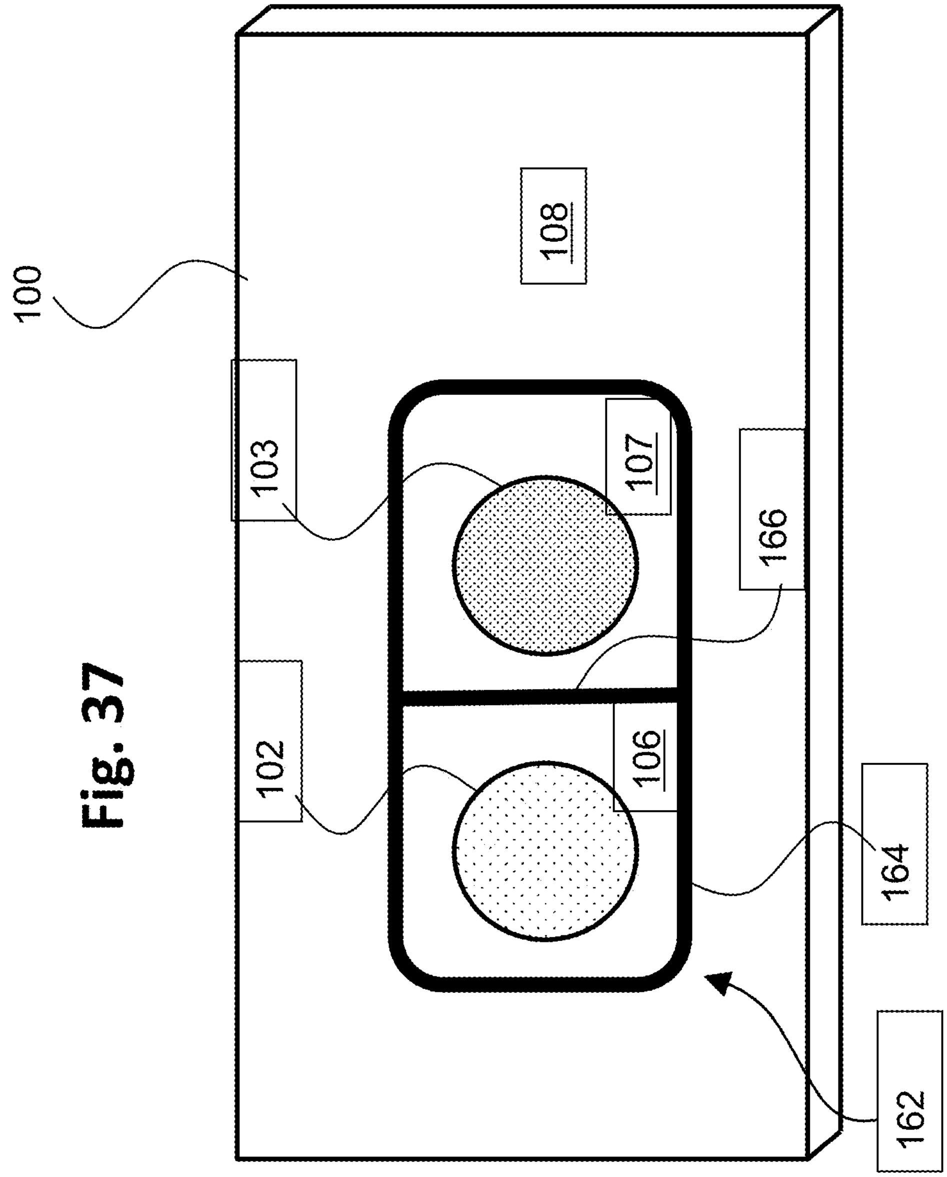
FIG. 37 is a drawing depicting a thirty-first barrier droplet configuration, which includes a retractable portion that controls droplet interaction during a reaction protocol.

In certain reaction protocols, interaction between droplets may be undesirable at certain reaction stages or steps, but desirable or required at other reaction stages or steps. Under such circumstances, barrier droplet configurations may be formed to obstruct migration pathways during certain portions of the reaction protocol, and then are reconfigured by electrowetting forces to permit droplet mixing or other interaction during other portions of the reaction protocol. For example, FIG. 37 is a drawing depicting a thirty-first barrier droplet configuration, by which a barrier droplet configuration 162 has been formed. The barrier droplet 162 encloses a first droplet 102 located within a device area 106, and a second droplet 103 located within a device area 107. The barrier droplet configuration 162 includes an outer barrier portion 164 that obstructs migration pathways between the devices areas 106 and 107 and the device area 108, thereby obstructing migration pathways between the droplets 102 and 103 and the remainder of the EWOD device array. In addition, the barrier droplet configuration 162 includes an inner barrier portion 166 that obstructs migration pathways between the device areas 106 and 107 themselves, thereby obstructing migration pathways between the first droplet 102 and the second droplet 103. Accordingly, in the state depicted in FIG. 37, mixing of constituents of the droplets 102 and 103 is obstructed by the presence of the inner barrier portion 166. During a reaction protocol, there may come a reaction stage or phase at which it becomes desirable for the droplets 102 and 103 to mix or otherwise interact. As such stage, electrowetting forces may be applied to retract the inner barrier portion 166, such as by moving the droplet material 166 into the outer barrier portion 164, thereby opening the areas 106 and 107 relative to each other. Obstruction of migration between the two droplets is thus removed, and electrowetting forces then may be applied to droplet 102 and/or droplet 103 to perform a suitable mixing or interaction of the two droplets, or the droplets may interact by ordinary diffusion.

Figure 38:
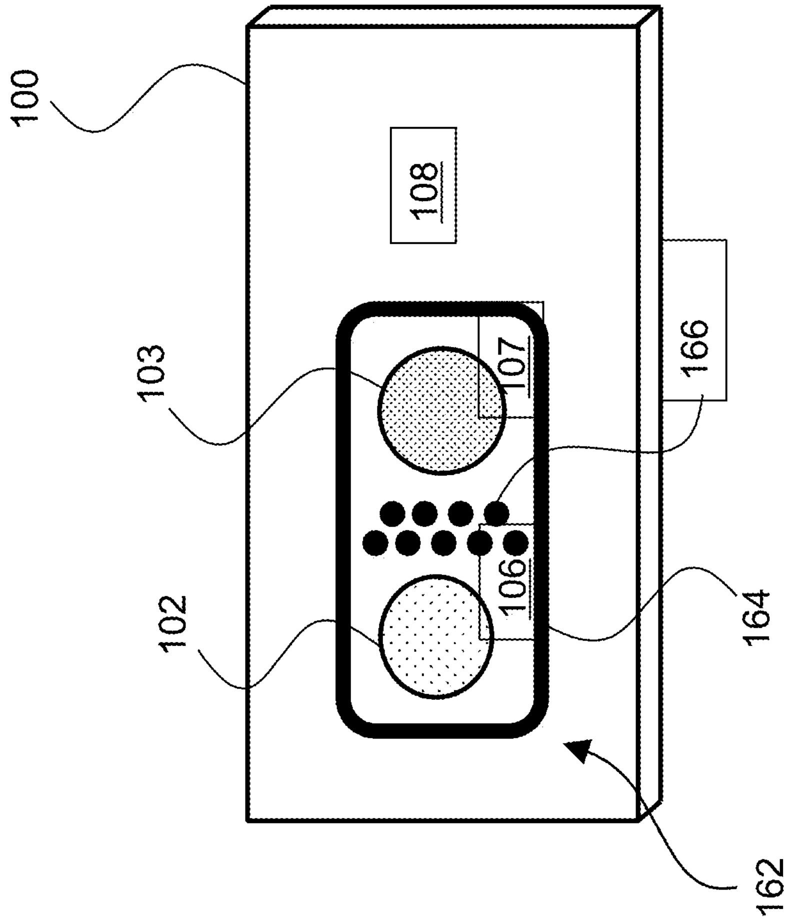
FIG. 38 is a drawing depicting a thirty-second barrier droplet configuration that is a variation of the embodiment of FIG. 37, in which the retractable portion is configured as a plurality of individual barrier droplets.
Figure 39:
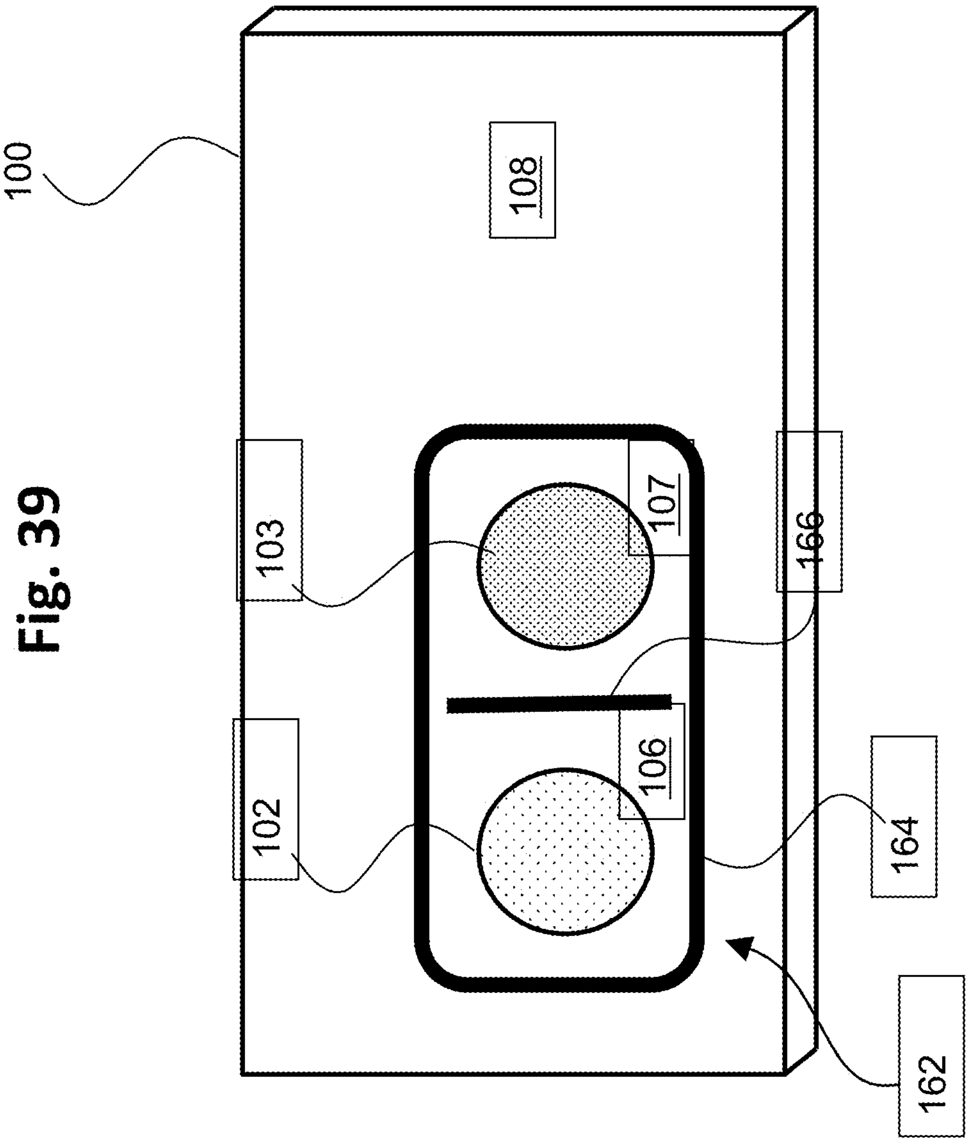
FIG. 39 is a drawing depicting a thirty-third barrier droplet configuration that is a variation of the embodiment of FIG. 37, in which the retractable portion is configured as a separate, single elongated barrier droplet.

In the example of FIG. 37, the barrier droplet configuration 162 is configured as a single barrier droplet that is configured into the desired shape. Other barrier droplet arrangements may be employed, such as described with respect to previous embodiments. For example, FIG. 38 is a drawing depicting a thirty-second barrier droplet configuration, in which the inner barrier portion 166 is configured as a double layer of offset individual barrier droplets. As another example, FIG. 39 is a drawing depicting a thirty-third barrier droplet configuration, in which the inner barrier portion 166 is configured as single linear elongated barrier droplet, which is formed separately from the outer barrier portion 164. The configuration of FIGS. 38 and 39 can be formed using simpler EWOD driving schemes as compared to the configuration of FIG. 37.

Figure 40:
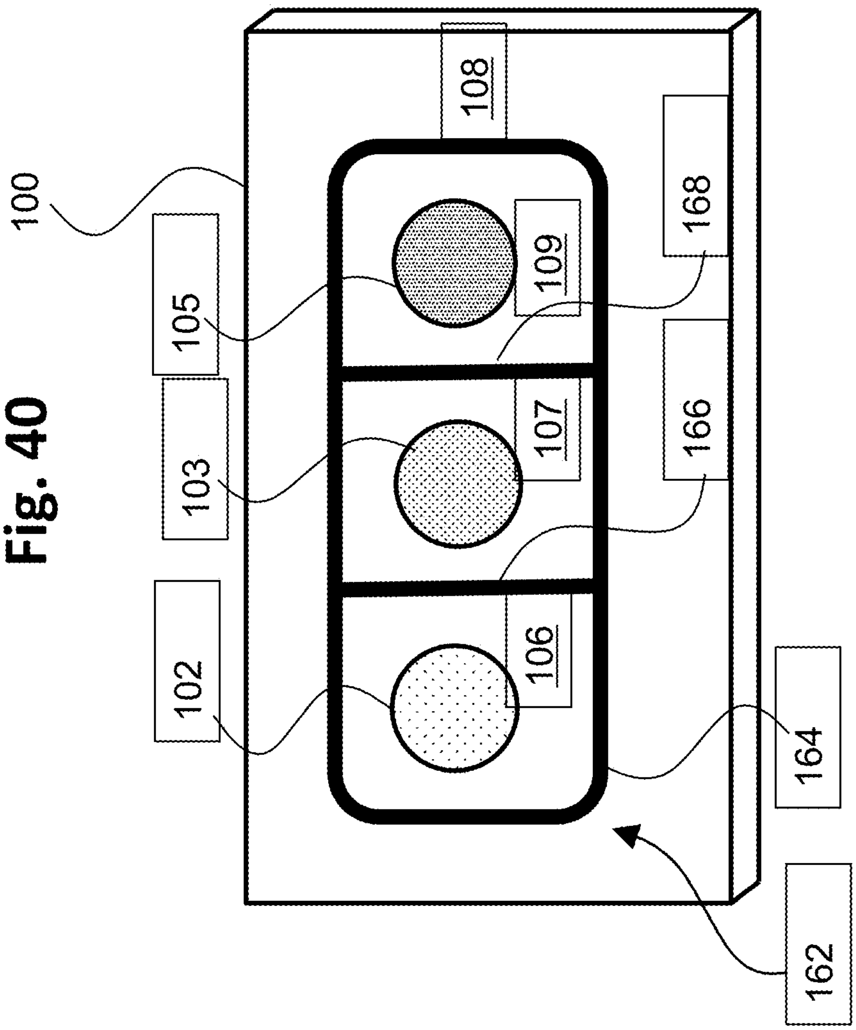
FIG. 40 is a drawing depicting a thirty-fourth barrier droplet configuration that is a variation of the embodiment of FIG. 37, expanded to demonstrate interaction control as to an additional droplet.

In the examples of FIGS. 37-39, the barrier droplet configuration is formed so as to separate two droplets during certain reaction stages, with a retractable portion that is retracted to permit droplet interaction at other reaction stages. Comparable principles may be expanded to apply to any number of droplets as may be suitable for a given reaction protocol. For example, FIG. 40 is a drawing depicting a thirty-fourth barrier droplet configuration, by which a barrier droplet configuration 162 has been formed that can control interaction among three droplets. Accordingly, a third droplet 105 is located within a device area 109. In addition, the barrier droplet configuration 162 further includes a second inner barrier portion 168 in addition to the first inner barrier portion 166 of the previous embodiment, whereby the second barrier portion 168 obstructs migration pathways between the second droplet 103 and the third droplet 105. The different portions of the barrier droplet configuration 162 may be configured in accordance with any of the embodiments. In addition, the different portions, including particularly the inner barrier portions 166 and 168, may be retracted or otherwise reconfigured independently of each other as a particular reaction protocol may warrant.

An aspect of the invention, therefore, is a method of operating an electrowetting on dielectric (EWOD) device that includes an EWOD device array that applies electrowetting forces and contains a non-polar fluid, whereby a barrier droplet configuration is formed using electrowetting forces to obstruct migration of a species from a first area of the EWOD device array to a protected area of the EWOD device array. In exemplary embodiments, the method of operating includes the steps of: dispensing a source droplet into a first area of the EWOD device array, the source droplet containing a migrating species, wherein the EWOD device array includes a second area to be protected from the migrating species; and forming a barrier droplet configuration positioned between the first area and the second area of the EWOD device array that obstructs a migration pathway of the migrating species between the first area and the second area; The barrier droplet configuration includes at least one polar or aqueous barrier droplet, and the barrier droplet inhibits diffusion of the migrating species by the migrating species exhibiting a preference for either the polar environment of the barrier droplet or for the non-aqueous environment of the non-polar fluid. The method of operating an EWOD device may include one or more of the following features, either individually or in combination.

In an exemplary embodiment of the method of operating an EWOD device, a concentration of the migrating species in the barrier droplet is lower than a concentration of the migrating species in the source droplet.

In an exemplary embodiment of the method of operating an EWOD device, the barrier droplet includes an additive that adjusts the preference of the migrating species for either the polar environment of the barrier droplet or the non-polar fluid.

In an exemplary embodiment of the method of operating an EWOD device, the additive comprises a capturing agent that reacts with or binds to the migrating species, or converts the migrating species into another form.

In an exemplary embodiment of the method of operating an EWOD device, the method further includes replenishing the additive of the barrier droplet.

In an exemplary embodiment of the method of operating an EWOD device, the barrier droplet configuration completely surrounds the first area of the EWOD device array.

In an exemplary embodiment of the method of operating an EWOD device, the barrier droplet configuration partially surrounds the first area of the EWOD device array.

In an exemplary embodiment of the method of operating an EWOD device, the barrier droplet configuration partially surrounds the second area of the EWOD device array that does not contain the source droplet.

In an exemplary embodiment of the method of operating an EWOD device, the barrier droplet configuration includes a plurality of barrier droplets.

In an exemplary embodiment of the method of operating an EWOD device, the barrier droplet configuration includes multiple concentric barrier droplets.

In an exemplary embodiment of the method of operating an EWOD device, the barrier droplet configuration includes multiple barrier droplets that in combination surround the first area of the EWOD device array.

In an exemplary embodiment of the method of operating an EWOD device, the barrier droplet configuration includes a first barrier droplet that surrounds the source droplet and a second barrier droplet that surrounds an area of the EWOD device array that may contain a second droplet.

In an exemplary embodiment of the method of operating an EWOD device, the second droplet includes a second migrating species that is different from the migrating species of the source droplet.

In an exemplary embodiment of the method of operating an EWOD device, the at least one barrier droplet comprises a barrier droplet that is linearly elongated to have a high aspect ratio in which the barrier droplet spans a first dimension that is an order of magnitude longer than a second dimension.

In an exemplary embodiment of the method of operating an EWOD device, the barrier droplet configuration comprises a plurality of individual droplets that are natively shaped and are arranged to obstruct the migration pathway.

In an exemplary embodiment of the method of operating an EWOD device, the plurality of individual droplets includes a first layer and a second layer, wherein individual droplets of the first layer are offset relative to individual droplets of the second layer.

In an exemplary embodiment of the method of operating an EWOD device, the barrier droplet configuration further comprises an additional barrier element that obstructs the migration pathway other than by forming a barrier droplet with the electrowetting forces.

In an exemplary embodiment of the method of operating an EWOD device, the additional barrier element comprises a physical barrier or hydrogel located on the EWOD device array.

In an exemplary embodiment of the method of operating an EWOD device, the additional barrier element comprises an edge of the EWOD device array.

In an exemplary embodiment of the method of operating an EWOD device, the method includes dispensing a first droplet into a first area of the EWOD device array; dispensing a second droplet into a second area of the EWOD device array; forming a barrier droplet configuration, wherein the barrier droplet configuration includes at least one polar or aqueous barrier droplet, and constituents of the first and second droplets exhibit a preference for either a polar environment of the barrier droplet or a non-aqueous environment of the non-polar fluid; wherein the barrier droplet configuration comprises a first portion that separates the first area from the second area, and a second portion that separates both the first and second areas from a third area of the EWOD device array, the method further comprising: maintaining the first portion of the barrier droplet configuration during a first stage of a reaction protocol, thereby obstructing a migration pathway between the first area and the second area during said first stage; and retracting the first portion of the barrier droplet configuration during a second stage of the reaction protocol, thereby opening the migration pathway between the first area and the second area to permit interaction of the first droplet and the second droplet during said second stage.

In an exemplary embodiment of the method of operating an EWOD device, the method further includes applying electrowetting voltages to the EWOD device array during the second stage of the reaction protocol to mix the first droplet and the second droplet.

According to another aspect of the invention, a microfluidic system includes an electro-wetting on dielectric (EWOD) device comprising an element array configured to receive one or more liquid droplets, the element array comprising a plurality of individual array elements; and a control system configured to control actuation voltages applied to the element array to perform manipulation operations as to the liquid droplets to perform the methods of operating the EWOD device that include forming a barrier droplet configuration. The microfluidic system further may include integrated impedance sensing circuitry that is integrated into the array elements of the EWOD device, and a configuration and position of source and barrier droplets dispensed onto the array elements is determined based on an impedance sensed by the impedance sensing circuitry.

Another aspect of the invention is a non-transitory computer-readable medium storing program code which is executed by a processing device for controlling actuation voltages applied to array elements of an element array of an electro-wetting on dielectric (EWOD) device for performing droplet manipulations on droplets on the element array, the program code being executable by the processing device to perform steps of the methods of operating the EWOD device that include forming a barrier droplet configuration.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide enhanced AM-EWOD device operation, and in particular can be employed to provide enhanced chemical and biochemical reaction protocols. The AM-EWOD device could form a part of a lab-on-a-chip system. Such devices could be used in manipulating, reacting and sensing chemical, biochemical or physiological materials.

REFERENCE SIGNS LIST

32—reader
34—cartridge
35—external sensor module
36—EWOD or AM-EWOD device
38—control electronics
40—storage device
42—connecting wires
44—lower substrate
46—thin film electronics
48—array element electrodes
48A—array element electrode
48B—array element electrode
50—electrode or element array
51—array element
52—liquid droplet
54—top substrate
56—spacer
58—reference electrode 60—non-polar fluid
62—insulator layer
64—first hydrophobic coating
66—contact angle
68—second hydrophobic coating
70A—electrical load with droplet present
70B—electrical load with no droplet present
72—array element circuit
74—integrated row driver
76—column driver circuits
78—row driver circuits
80—column detection circuits
82—serial interface
84—voltage supply interface
86—connecting wires
88—actuation circuit
90—droplet sensing circuit
100—EWOD device array
102—first droplet
103—second droplet
104—barrier droplet
105—third droplet
106—first area
107—device area
108—second area
109—device area
110—barrier droplet
112—additive
114—first barrier droplet
116—second barrier droplet
118—first barrier droplet
120—second barrier droplet
122—first droplet
124—second droplet
126—barrier droplet
128—barrier droplet
130—closed barrier droplet
132—barrier droplet
134—barrier element
136—device edge
138—multiple barrier droplets
140—multiple barrier droplets
142—first linear elongated barrier droplet
144—second linear elongated barrier droplet
146—additive
148—first layer of individual droplets
150—second layer of individual droplets
152—individual droplets
152*a*—layer of individual droplets
152*b*—layer of individual droplets
154—device edge
156—device corner edge
158—barrier element
160—single linear elongated barrier droplet
162—barrier droplet configuration
164—outer barrier portion
166—inner barrier portion
168—second inner barrier portion

What is claimed is:

1. A method of operating an electrowetting on dielectric (EWOD) device that includes an EWOD device array that applies electrowetting forces and contains a non-polar fluid, the method of operating comprising the steps of: dispensing a source droplet into a first area of the EWOD device array, the source droplet containing a migrating species, wherein the EWOD device array includes a second area to be protected from the migrating species; and forming a barrier droplet configuration positioned between the first area and the second area of the EWOD device array that obstructs a migration pathway of the migrating species between the first area and the second area; wherein forming the barrier droplet configuration comprises applying electrowetting forces to form at least one polar or aqueous barrier droplet, and the barrier droplet configuration acts as a barrier to trap, obstruct, or otherwise prevent migration of a dissolved or suspended species in the source droplet through the non-aqueous environment of the non-polar fluid.

2. The method of operating an EWOD device of claim 1, wherein a concentration of the migrating species in the barrier droplet is lower than a concentration of the migrating species in the source droplet.

3. The method of operating an EWOD device of claim 1, wherein the barrier droplet includes an additive that adjusts the preference of the migrating species for either the polar environment of the barrier droplet or the non-polar fluid.

4. The method of operating an EWOD device of claim 3, wherein the additive comprises a capturing agent that reacts with or binds to the migrating species, or converts the migrating species into another form.

5. The method of operating an EWOD device of any of claim 3, further comprising replenishing the additive of the barrier droplet.

6. The method of operating an EWOD device of claim 1, wherein the barrier droplet configuration completely surrounds the first area of the EWOD device array.

7. The method of operating an EWOD device of claim 1, wherein the barrier droplet configuration partially surrounds the first area of the EWOD device array.

8. The method of operating an EWOD device of claim 1, wherein the barrier droplet configuration partially surrounds the second area of the EWOD device array that does not contain the source droplet.

9. The method of operating an EWOD device of claim 1, wherein the barrier droplet configuration includes a plurality of barrier droplets.

10. The method of operating an EWOD device of claim 1, wherein the barrier droplet configuration includes multiple concentric barrier droplets.

11. The method of operating an EWOD of claim 1, wherein the barrier droplet configuration includes multiple barrier droplets that in combination surround the first area of the EWOD device array.

12. The method of operating an EWOD device of claim 1, wherein the barrier droplet configuration includes a first barrier droplet that surrounds the source droplet and a second barrier droplet that surrounds an area of the EWOD device array that may contain a second droplet.

13. The method of operating an EWOD device of claim 12, wherein the second droplet includes a second migrating species that is different from the migrating species of the source droplet.

14. The method of operating an EWOD device of claim 1, wherein the at least one barrier droplet comprises a barrier droplet that is linearly elongated to have a high aspect ratio in which the barrier droplet spans a first dimension that is an order of magnitude longer than a second dimension.

15. The method of operating an EWOD device of claim 1, wherein the barrier droplet configuration comprises a plurality of individual droplets that are natively shaped or square shaped and are arranged to obstruct the migration pathway.

16. The method of operating an EWOD device of claim 15, wherein the plurality of individual droplets includes a first layer and a second layer, wherein individual droplets of the first layer are offset relative to individual droplets of the second layer.

17. The method of operating an EWOD device of claim 1, wherein the barrier droplet configuration further comprises an additional barrier element that obstructs the migration pathway other than by forming a barrier droplet with the electrowetting forces.

18. The method of operating an EWOD device of claim 17, wherein the additional barrier element comprises a physical barrier or hydrogel located on the EWOD device array.

19. The method of operating an EWOD device of claim 17, wherein the additional barrier element comprises an edge of the EWOD device array.

20. A method of operating an electrowetting on dielectric (EWOD) device that includes an EWOD device array that applies electrowetting forces and contains a non-polar fluid, the method of operating comprising the steps of: dispensing a first droplet into a first area of the EWOD device array; dispensing a second droplet into a second area of the EWOD device array; forming a barrier droplet configuration by applying electrowetting forces, wherein the barrier droplet configuration includes at least one polar or aqueous barrier droplet, and acts as a barrier to trap, obstruct, or otherwise prevent migration of a dissolved or suspended species in the first and/or second droplet through the non-aqueous environment of the non- polar fluid; wherein the barrier droplet configuration comprises a first portion that separates the first area from the second area, and a second portion that separates both the first and second areas from a third area of the EWOD device array, the method further comprising: maintaining the first portion of the barrier droplet configuration during a first stage of a reaction protocol, thereby obstructing a migration pathway between the first area and the second area during said first stage; and retracting the first portion of the barrier droplet configuration during a second stage of the reaction protocol, thereby opening the migration pathway between the first area and the second area to permit interaction of the first droplet and the second droplet during said second stage.

21. The method of operating an EWOD device of claim 20, further comprising applying electrowetting voltages to the EWOD device array during the second stage of the reaction protocol to mix the first droplet and the second droplet.

22. A microfluidic system comprising:

an electro-wetting on dielectric (EWOD) device comprising an element array configured to receive one or more liquid droplets, the element array comprising a plurality of individual array elements; and a control system configured to control actuation voltages applied to the element array to perform manipulation operations as to the liquid droplets to perform the method of operating an EWOD device according to claim 1.

23. The microfluidic system of claim 22, further comprising integrated impedance sensing circuitry that is integrated into the array elements of the EWOD device, and a configuration and position of source and barrier droplets dispensed onto the array elements is determined based on an impedance sensed by the impedance sensing circuitry.

24. A non-transitory computer-readable medium storing program code which is executed by a processing device for controlling actuation voltages applied to array elements of an element array of an electro-wetting on dielectric (EWOD) device for performing droplet manipulations on droplets on the element array, the program code being executable by the processing device to perform the steps of: dispensing a source droplet into a first area of the EWOD device array, the source droplet containing a migrating species, wherein the EWOD device array includes a second area to be protected from the migrating species; and forming a barrier droplet configuration positioned between the first area and the second area of the EWOD device array that obstructs a migration pathway of the migrating species between the first area and the second area; wherein forming the barrier droplet configuration comprises applying electrowetting forces to form at least one polar or aqueous barrier droplet, and the barrier droplet configuration acts as a barrier to trap, obstruct, or otherwise prevent migration of a dissolved or suspended species in the source droplet through the non-aqueous environment of the non- polar fluid.

25. The non-transitory computer readable medium of claim 24, wherein the program code is executable by the processing device to perform the steps of the operating method of claim 2.

* * * * *